US008240896B2

(12) United States Patent
Abe

(10) Patent No.: US 8,240,896 B2
(45) Date of Patent: Aug. 14, 2012

(54) VEHICLE HEADLAMP

(75) Inventor: Toshiya Abe, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 350 days.

(21) Appl. No.: 12/603,307

(22) Filed: Oct. 21, 2009

(65) Prior Publication Data

US 2010/0110710 A1 May 6, 2010

(30) Foreign Application Priority Data

Oct. 30, 2008 (JP) ................................. 2008-280072

(51) Int. Cl.
*F21V 7/16* (2006.01)
*B60Q 1/06* (2006.01)

(52) U.S. Cl. ......................... 362/514; 362/517; 362/281

(58) Field of Classification Search .................. 362/513, 362/514, 465, 517, 281, 283
See application file for complete search history.

(56) References Cited

U.S. PATENT DOCUMENTS 1,305,498 A 6/1919 Schroeder
1,389,273 A 8/1921 Schroeder
1,806,897 A 5/1931 Gerry
5,060,120 A * 10/1991 Kobayashi et al. ........... 362/465
6,334,702 B1 * 1/2002 Albou ........................... 362/514
6,457,849 B2 * 10/2002 Tsukamoto .................... 362/509
6,478,460 B2 * 11/2002 Furuya et al. ................. 362/514
6,607,294 B2 * 8/2003 Taniuchi ........................ 362/514
6,626,565 B2 * 9/2003 Ishida ........................... 362/514
6,843,588 B2 * 1/2005 Iwamoto et al. .............. 362/466
7,703,961 B2 * 4/2010 Yatsuda et al. ................ 362/545
2008/0089085 A1 * 4/2008 Popelek ........................ 362/514

FOREIGN PATENT DOCUMENTS

JP 5-174602 A 7/1993
JP 2002-260414 A 9/2002

* cited by examiner

*Primary Examiner* — Peggy A. Neils
(74) *Attorney, Agent, or Firm* — Foley & Lardner LLP

(57) ABSTRACT

A vehicle headlamp with improved vibration proof of a movable reflector is provided. The vehicle headlamp has: a holder; an upside movable reflector and a downside movable reflector; light sources; and a drive unit. The drive unit is made up of a motor and a drive force transmission mechanism. The drive force transmission mechanism rotates the upside and downside movable reflectors in reverse directions, respectively. As a result, the vehicle headlamp can improve the vibration proof of the upside and downside movable reflectors.

17 Claims, 20 Drawing Sheets

VEHICLE HEADLAMP

CROSS-REFERENCE TO RELATED APPLICATIONS

This application claims priority of Japanese Patent Application No. 2008-280072 filed on Oct. 30, 2008. The contents of this application are incorporated herein by reference in their entirety.

BACKGROUND OF THE INVENTION

1. Field of the Invention

The present invention relates to a vehicle headlamp for illuminating a light distribution pattern toward a forward direction of a vehicle by changing it over to a light distribution pattern for low beam (light distribution pattern for passing) or a light distribution pattern for high beam (light distribution pattern for cruising).

2. Description of the Related Art

A vehicle headlamp of this type is conventionally known (Japanese Laid-open Patent Application No 2002-260414, for example). Hereinafter, the conventional vehicle headlamp will be described. The conventional vehicle headlamp is provided with: a frame; a movable reflector swingably mounted on the frame; a light source mounted on the frame; and a solenoid for tilting the movable reflector. Hereinafter, functions of the conventional vehicle headlamp will be described. When a light source is lit and the solenoid is driven to thereby tilt the movable reflector, a passing beam and a cruising beam are changed over from each other.

In addition, in the conventional vehicle headlamp, the movable reflector is adapted to be free of a forward or backward movement due to an action of a plate spring. Thus, the vehicle headlamp of this type requires vibration proof (durability) of the movable reflector relative to vibration at the time of vehicle cruising.

The present invention has been made to solve the aforementioned problem that the movable reflector requires vibration proof.

SUMMARY OF THE INVENTION

A first aspect of the present invention is directed to a vehicle headlamp, comprising:

(i) a holder;

(ii) a first movable reflector and a second movable reflector, a respective one of which is rotatably held on the holder;

(iii) a light source which is fixed and held on the holder; and (iv) a drive unit for changing over a light distribution pattern while rotating the first movable reflector and the second movable reflector between a first location and a second location, respectively, in synchronism with each other, wherein the drive unit includes:

a drive source which is held on the holder; and a drive force transmission mechanism which is held on a lateral site relative to the first movable reflector, the second movable reflector, and the light source, of the holder, and is provided between the drive source and a respective one of the first movable reflector and the second movable reflector, for transmitting a drive force generated in the drive source to the first movable reflector and the second movable reflector, respectively, to rotate the first movable reflector and the second movable reflector, respectively, in reverse directions.

A second aspect of the present invention is directed to the vehicle headlamp according to the first aspect, wherein:

a mass of the first movable reflector is equal to or substantially equal to a mass of the second movable reflector; and a distance from a gravity to a rotational center of the first movable reflector is equal to or substantially equal to a distance from a gravity to a rotational center of the second movable reflector.

A third aspect of the present invention is directed to the vehicle headlamp according to the first aspect, wherein:

between: a coupling portion between the drive source of the drive unit and the drive force transmission mechanism; and the holder, a restoration spring is provided for restoring the first movable reflector and the second movable reflector to the first location in a case where driving of the drive unit is stopped when the first movable reflector and the second movable reflector are positioned in the second location or is rotating from the first location to the second location.

A fourth aspect of the present invention is directed to the vehicle headlamp according to the first aspect, wherein:

the drive source of the drive unit is directly fixed and held on a heat sink member via the holder.

A fifth aspect of the present invention is directed to the vehicle headlamp according to the first aspect, wherein:

either one of the first movable reflector and the second movable reflector is dummy.

A sixth aspect of the present invention is directed to a vehicle headlamp, comprising:

(i) a semiconductor-type light source for illuminating light;

(ii) a first reflector made of a parabola-based curved face, including a plurality of reflecting surfaces for reflecting light radiated from the semiconductor-type light source as reflection light and illuminating the reflected light toward a forward direction of a vehicle;

(iii) a second reflector which is movable between a first location and a second location, for shading the light reflected by means of the reflecting surfaces of the first reflector and changing over a light distribution pattern in accordance with the shaded reflecting surface; and (iv) a drive unit which is driven in accordance with a power distribution state of a drive source, wherein:

the drive unit is driven in accordance to the power distribution state of the drive source to thereby move the second reflector between the first location and the second location.

A seventh aspect of the present invention is directed to the vehicle headlamp according to the sixth aspect, wherein:

the second reflector has a rotary shaft, and is adapted to be rotatable between the first location and the second location via the rotary shaft; and the drive unit includes a drive force transmission mechanism which moves in a forward/backward direction of the vehicle in accordance with a power distribution state of the drive source, for transmitting a drive force to the rotary shaft of the second reflector due to the movement.

A eighth aspect of the present invention is directed to the vehicle headlamp according to the sixth aspect, wherein:

the drive unit drives the second reflector to move from the first location to the second location in a state in which power is distributed to the drive source; and drives the second reflector to move from the second location to the first location in a state in which power is not distributed to the drive source.

A ninth aspect of the present invention is directed to the vehicle headlamp according to the sixth aspect, further including a restoration spring for holding a restoration force to the first location, as the second reflector moves from the first location to the second location, and moving the second reflector from the second location to the first location by utilizing the restoration force.

A tenth aspect of the present invention is directed to the vehicle headlamp according to the sixth aspect, further including a restoration spring for holding a restoration force to the first location, as the second reflector moves from the first location to the second location, and moving the second reflector from the second location to the first location by utilizing the restoration force, wherein:

the drive unit drives the second reflector to move from the first location to the second location in a state in which power is distributed to the drive source; and drives the second reflector to move from the second location to the first location by utilizing the restoration force of the restoration spring in a state in which power is not distributed to the drive source.

An eleventh aspect of the present invention is directed to the vehicle headlamp according to the sixth aspect, further including a stopper mechanism for braking the second reflector to the first location or the second location.

A twelfth aspect of the present invention is directed to the vehicle headlamp according to the sixth aspect, wherein:

the plurality of reflecting surfaces of the first reflector include a reflecting surface for a light distribution pattern for low beam and a reflecting surface for a light distribution pattern for high beam;

the second reflector includes the reflecting surface for the light distribution pattern for high beam;

when the second reflector is in the first location, reflection light reflected on the reflecting surface for the light distribution pattern for high beam, of the first reflector, is shaded by means of the reflecting surface for the light distribution pattern for high beam, of the second reflector;

the reflection light reflected on the reflecting surface for the light distribution pattern for low beam, of the first reflector, is illuminated to the forward direction of the vehicle, as a light distribution pattern for low beam;

when the second reflector is in the second location, reflection light reflected on the reflecting surface for the light distribution pattern for low beam, of the first reflector, is shaded by means of the reflecting surface for the light distribution pattern for high beam, of the second reflector; and a respective one of beams of the reflection light reflected on the reflecting surface for the light distribution pattern for low beam, of the first reflector, and the reflecting surface for the light distribution pattern for high beam, of the second reflector, is illuminated to the forward direction of the vehicle, as a light distribution pattern for high beam.

A thirteenth aspect of the present invention is directed to a vehicle headlamp, comprising:

(i) a semiconductor-type light source for illuminating light (ii) a first reflector made of a parabola-based free curved face, including a plurality of reflecting surfaces for reflecting light radiated from the semiconductor-type light source as reflection light and illuminating the reflected light toward a forward direction of a vehicle;

(iii) a second reflector which is movable between a first location and a second location, for shading the light reflected by means of the reflecting surfaces of the first reflector and changing over a light distribution pattern in accordance with the shaded reflecting surface; and (iv) a drive unit which is driven in accordance with a power distribution state of a drive source to thereby move the second reflector between the first location and the second location, wherein:

the second reflector has a rotary shaft, and is adapted to be rotatable between the first location and the second location via the rotary shaft; and the drive unit includes a drive force transmission mechanism which moves in a forward/backward direction of the vehicle in accordance with a power distribution state of the drive source, for transmitting a drive force to the rotary shaft of the second reflector due to the movement.

A fourteenth aspect of the present invention is directed to the vehicle headlamp according to the thirteenth aspect, wherein:

the drive unit drives the second reflector to move from the first location to the second location in a state in which power is distributed to the drive source; and drives the second reflector to move from the second location to the first location in a state in which power is not distributed to the drive source.

A fifteenth aspect of the present invention is directed to the vehicle headlamp according to the thirteenth aspect, further including a restoration spring for holding a restoration force to the first location, as the second reflector moves from the first location to the second location, and moving the second reflector from the second location to the first location by utilizing the restoration force.

A sixteenth aspect of the present invention is directed to the vehicle headlamp according to the thirteenth aspect, further including a restoration spring for holding a restoration force to the first location, as the second reflector moves from the first location to the second location, and moving the second reflector from the second location to the first location by utilizing the restoration force, wherein:

the drive unit drives the second reflector to move from the first location to the second location in a state in which power is distributed to the drive source; and drives the second reflector to move from the second location to the first location in a state in which power is not distributed to the drive source by utilizing the restoration force.

A seventeenth aspect of the present invention is directed to the vehicle headlamp according to the thirteenth aspect, further including a stopper mechanism for braking the second reflector to the first location or the second location.

An eighteenth aspect of the present invention is directed to the vehicle headlamp according to the thirteenth aspect, wherein:

the plurality of reflecting surfaces of the first reflector include a reflecting surface for a light distribution pattern for low beam and a reflecting surface for a light distribution pattern for high beam;

the second reflector includes the reflecting surface for the light distribution pattern for high beam;

when the second reflector is in the first location, reflection light reflected on the reflecting surface for the light distribution pattern for high beam, of the first reflector, is shaded by means of the reflecting surface for the light distribution pattern for high beam, of the second reflector;

the reflection light reflected on the reflecting surface for the light distribution pattern for low beam, of the first reflector, is illuminated to the forward direction of the vehicle, as a light distribution pattern for low beam;

when the second reflector is in the second location, reflection light reflected on the reflecting surface for the light distribution pattern for low beam, of the first reflector, is shaded by means of the reflecting surface for the light distribution pattern for high beam, of the second reflector; and a respective one of beams of the reflection light reflected on the reflecting surface for the light distribution pattern for low beam, of the first reflector, and the reflecting surface for the light distribution pattern for high beam, of the second reflector, is illuminated to the forward direction of the vehicle, as a light distribution pattern for high beam.

The vehicle headlamp according to the first aspect of the present invention allows a drive unit to be driven to rotate a first movable reflector and a second movable reflector between a first location and a second location, whereby a light distribution pattern can be changed over.

Moreover, the vehicle headlamp according to the first aspect of the present invention has a drive force transmission mechanism for rotating the first and second movable reflectors in the reverse directions if acceleration in a given direction occurs to a first movable reflector and a second movable reflector after vibration at the time of vehicle cruising acts on the first and second reflectors, in which forces in the reverse directions mutually act thereon and are mutually canceled out, allowing the first and second movable reflectors to be in a static state. Therefore, the vehicle headlamp according to the first aspect of the present invention improves vibration proof and durability of the first and second reflectors.

In addition, the vehicle headlamp according to the second aspect of the present invention allows a mass of the first movable reflectors to be equal to or substantially equal to that of the second movable reflector and a distance from a gravity to a rotational center of the first movable reflector to be equal to or substantially equal to that of the second movable reflector, so that the forces in the reverse directions in the drive force transmission mechanism becomes mutually equal to each other and can be mutually completely or substantially completely canceled out. In this manner, the vehicle headlamp according to the second embodiment of the present invention further improves vibration proof and durability of the first and second reflectors.

Further, the vehicle headlamp according to the third aspect of the present invention allows the first and second movable reflectors to be restored to a first location by means of action of a restoration spring if driving of the drive unit stops when the first and second movable reflectors are positioned in a second location or is rotating from the first location to the second location. Therefore, the vehicle headlamp according to the third aspect of the present invention has a fail-safe function. For example, when the first and second movable reflectors are positioned in the first location, a light distribution pattern for low beam is obtained, and on the other hand, when the first and second movable reflectors are positioned in the second location, in a case where a light distribution pattern for high beam is obtained, the light distribution pattern for high beam can be changed over to a light distribution pattern for low beam.

Moreover, the vehicle headlamp according to the third aspect of the present invention allows a restoration spring to be provided at the side of a drive force transmission mechanism held on a lateral site relative to the first and second movable reflectors and a light source and to be provided between a holder and the drive unit, thus precluding a spring force of the restoration spring from directly acting on the first and second movable reflectors. Therefore, the vehicle headlamp according to the third aspect of the present invention precludes an eccentric load of the spring force of the restoration spring from being applied to the first and second movable reflectors, so that distortion such as torsion hardly occurs to the first and second movable reflectors, and as a result, a change of light distribution hardly occurs, so that light distribution can be controlled with high precision accordingly.

In addition, the vehicle headlamp according to the third aspect of the present invention allows a restoration spring to be provided between: a coupling portion between a drive source of a drive unit and a drive force transmission mechanism; and a holder, so that a spring force (restoration torque) of the restoration spring can be directly imparted to the coupling portion between the drive source of the drive unit and the drive force transmission mechanism. In this manner, the vehicle headlamp according to the third aspect of the present invention allows the first and second movable reflectors to be automatically restored to the first location via the drive force transmission mechanism with a small spring force (restoration torque) of the restoration spring, thus enabling downsizing and weight reduction of the restoration spring accordingly.

Further, the vehicle headlamp according to the third aspect of the present invention allows a restoration spring to be provided between the holder and the drive unit, thus enabling the restoration spring to be disposed at a site spaced from a rotation holding site of the first and second movable reflectors. In this manner, the vehicle headlamp according to the third aspect of the present invention enables downsizing of a structure of the rotation holding site of the first and second movable reflectors, so that the appearance of the head lamp can be improved accordingly.

Furthermore, the vehicle headlamp according to the fourth aspect of the present invention allows a drive source of a drive unit to be directly fixed and held on a heat sink member via a holder, thus enabling a heat generated while the drive source is driven to be thereby radiated (dissipated) from the heat sink member to the outside. In this manner, the vehicle headlamp according to the fourth aspect of the present invention improves thermal resistance and durability of the drive source of the drive unit.

Still furthermore, the vehicle headlamp according to the fifth aspect of the present invention allows either one of the first and second movable reflectors to be dummy, whereby it becomes sufficient if a reflecting surface be merely provided at the other one of the first and second movable reflectors. Therefore, the vehicle headlamp according to the fifth aspect of the present invention simplifies a light distribution design or light distribution control of the reflecting surface of the movable reflector.

DESCRIPTION OF THE PREFERRED EMBODIMENTS

Figure 15:
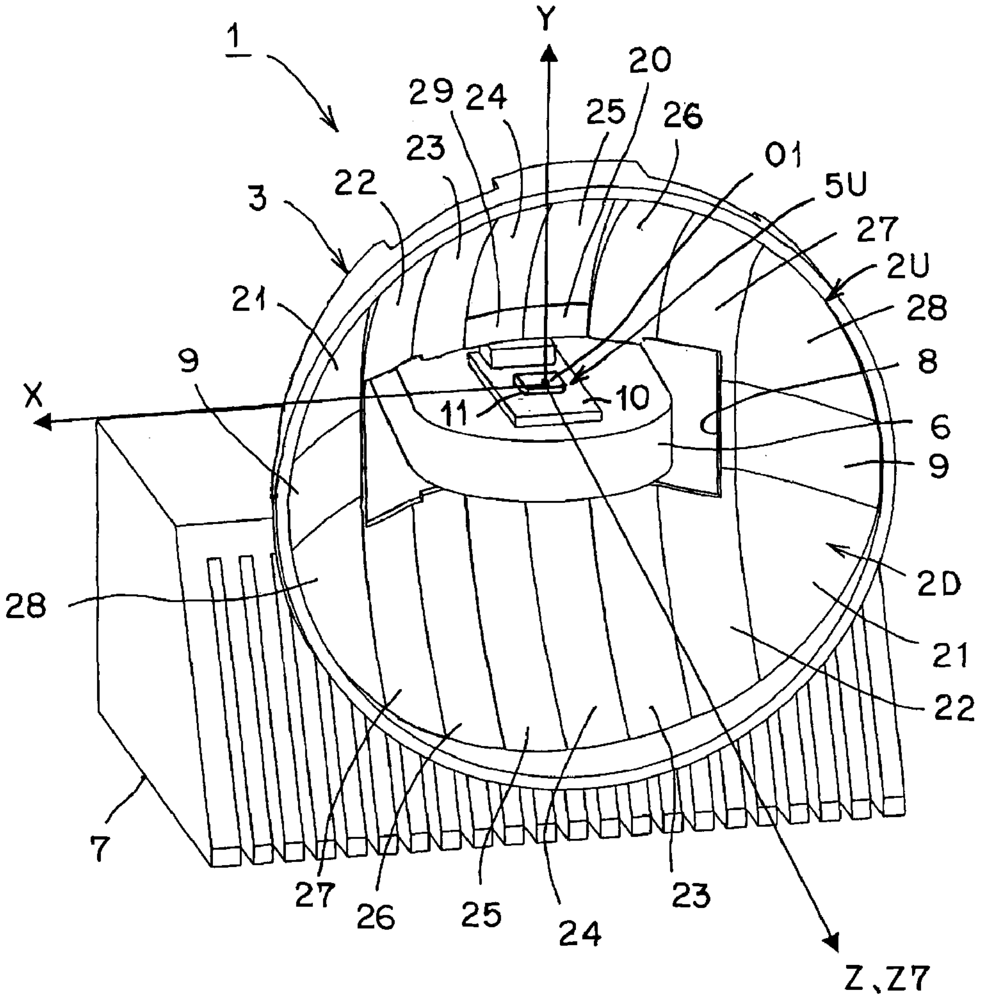
FIG. 15 is a perspective view showing essential parts when the upside movable reflector, the downside movable reflector, and the drive unit are removed, similarly.
Figure 24:
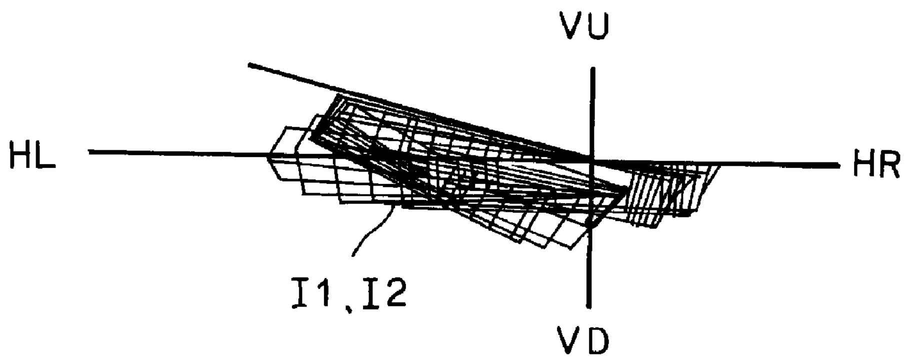
FIG. 24 is an explanatory view showing a reflecting image group of the light emitting chip, obtained on the first reflecting surface made of the fourth segment, similarly.
Figure 25:
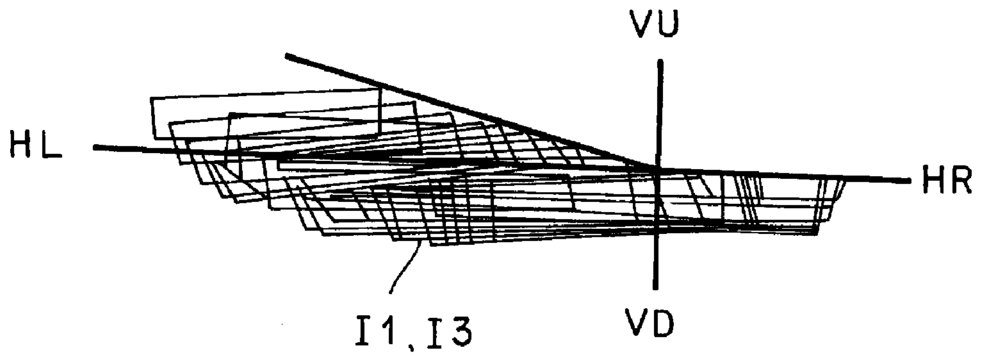
FIG. 25 is an explanatory view showing a reflecting image group of the light emitting chip, obtained on the second reflecting surface made of the fifth segment, similarly.

Hereinafter, embodiments of a vehicle headlamp according to the present invention will be described in detail, referring to the drawings. The present invention is not limited by these embodiments. In the drawings, the uppercase letter "VU-VD" designates a vertical line of the upside to downside of a screen. The uppercase letter "HL-HR" designates a horizontal line of the left to right of the screen. FIGS. 24 and 25 are explanatory views each showing the reflecting image group of the light emitting chip on the screen, obtained through computer simulation. In the specification and claims, the terms "top", "bottom", "front", "rear", "left", and "right" designate the top, bottom, front, rear, left, and right of a vehicle when the vehicle headlamp according to the present invention is mounted on the vehicle (automobile). In addition, in FIGS. 15, 16, and 17, in order to clarify the constitution of the invention, an upside movable reflector 13U, a downside movable reflector 13D, and a drive unit 14 are not shown. Further, in FIGS. 7, 8, 9, and 10, the fin-like shape of a heat sink member 7 is not shown.

Hereinafter, a constitution of a vehicle headlamp in the embodiment will be described. In the figures, reference numeral 1 designates a vehicle headlamp (automobile headlamp) in the embodiment. The vehicle headlamp 1 illuminates light toward a forward direction of the vehicle by changing over a light distribution pattern for passing (light distribution pattern for low beam) shown in FIG. 26, i.e., a light distribution pattern LP for low beam, having an oblique cutoff line CL1 on a cruising lane side (left side) and a horizontal cutoff line CL2 on an opposite lane side (right side), with an elbow point E serving as a boundary; a light distribution pattern for cruising (light distribution pattern for high beam) shown in FIG. 27, i.e., a first light distribution pattern HP1 for high beam, a second light distribution pattern HP2 for high beam, a third light distribution pattern HP3 for high beam, and a light distribution pattern LP1 for dimming low beam. An angle formed between the oblique cutoff line CL1 and the horizontal line HL-HR of the screen is about 15 degrees.

The vehicle headlamp 1 is made up of: a fixed reflector 3 having an upside reflecting surface 2U and a downside reflecting surface 2D made of a parabola-based free curved face (NURBS-curved face); an upside movable reflector (first movable reflector) 13U having an upside reflecting surface 12U and a downside movable reflector (second movable reflector) 13D having a downside reflecting surface 12D, which is made of a parabola-based free curved face (NURBS-curved face); an upside semiconductor-type light source 5U and a downside semiconductor-type light source 5D having a light emitting chip 4 formed in a planar rectangle shape (planar elongate shape); a holder 6 (housing); a heat sink member 7; a drive unit 14; and a lamp housing and a lamp lens (such as transparent outer lens, for example), although not shown.

The holder 6 is shaped like a plate having an upper fixing face and a lower fixing face. The holder 6 is made up of a resin member or a metal member with high conductivity, for example. The heat sink member 7 is formed in a trapezoidal shape having an upper fixing face at its upper part and is shaped like a fin from an intermediate part to a lower part. The heat sink member 7 is made up of a resin member or a metal member with high thermal conductivity, for example.

The fixed reflector 3, the upside movable reflector 13U, the downside movable reflector 13D, the upside semiconductor-type light source 5U, the downside semiconductor-type light source 5D, the holder 6, the heat sink member 7, and the drive unit 14 constitute a lamp unit. In other words, the fixed reflector 3 is fixed and held at the holder 6. The upside movable reflector 13U and the downside movable reflector 13D are rotatably mounted on the holder 6 around a horizontal axis X. The upside semiconductor-type light source 5U is fixed and held on an upper fixing face of the holder 6. The downside semiconductor-type light source 5D is fixed and held on a lower fixing face of the holder 6. The holder 6 is fixed and held on an upper fixing face of the heat sink member 7. The drive unit 14 is fixed and held on an upper fixing face of the holder 6 and the heat sink member 7.

The lamp units 3, 5U, 5D, 6, 7, 13U, 13D, 14 are disposed in a lamp room partitioned by the lamp housing and the lamp lens, via a light axis adjustment mechanism, for example. In the lamp room, apart from the lamp units 3, 5U, 5D, 6, 7, 13U, 13D, 14, other lamp units such as a fog lamp, a cornering lamp, a clearance lamp, a turn signal lamp may be disposed.

Figure 1:
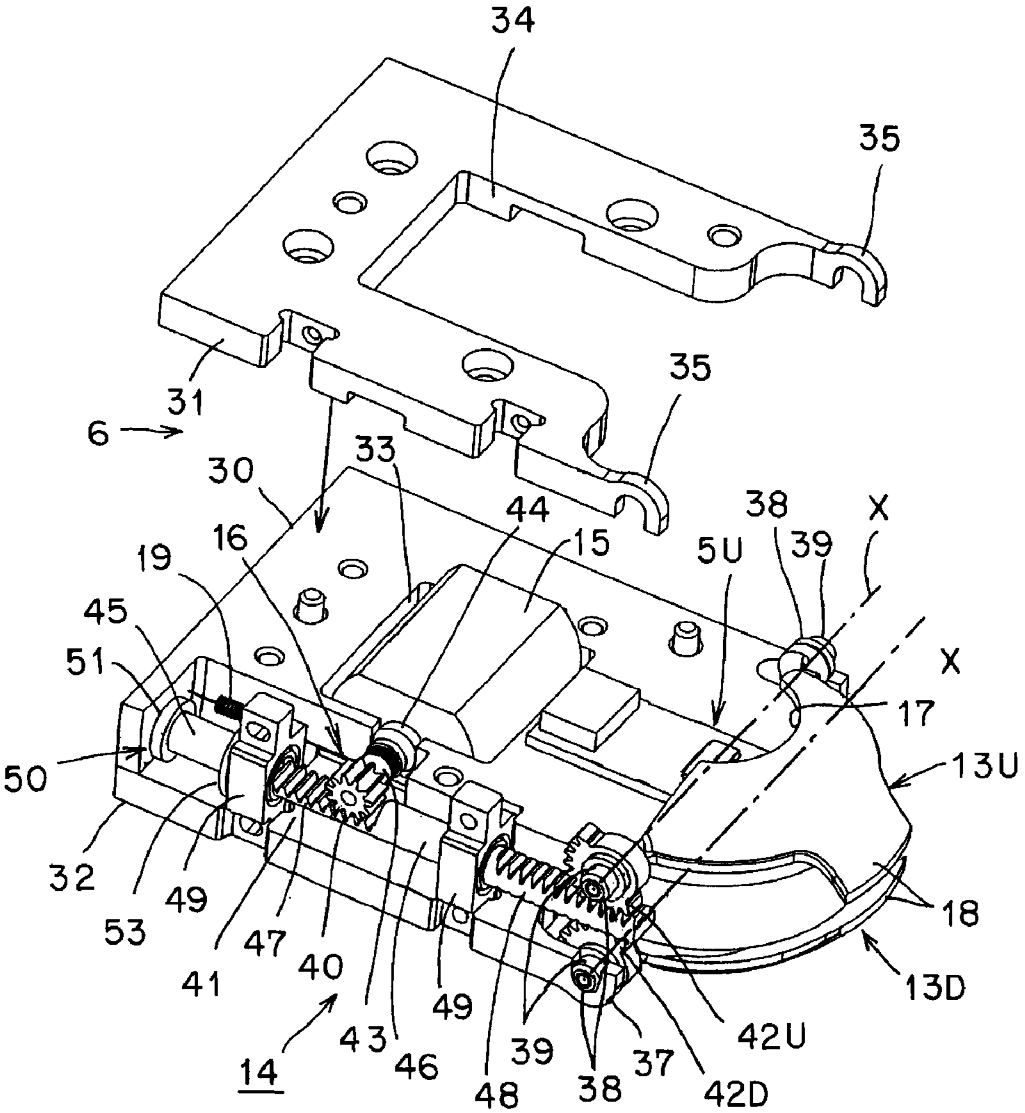
FIG. 1 shows an embodiment of a vehicle headlamp according to the present invention, and is a perspective view of essential parts when an upside movable reflector and a downside movable reflector are positioned in a first location.

The holder 6, as shown in FIG. 1, is made up of a middle holder 30, an upper holder 31, and a lower holder 32. An accommodation hole 33 is provided at a center of the middle holder 30. An accommodation opening 34 is provided at a portion from a center to a front side of the upper holder 31. An inverted U-shaped receptacle 35 is provided at a respective one of the front left and right sides of the upper holder 31. An accommodation opening 36 is provided at a portion from a center to a front side of the lower holder 32. A U-shaped receptacle 37 is provided at a respective one of the frontal left and right sides of the lower holder 32.

The middle holder 30, the upper holder 31, and the lower holder 32, of the holder 6, are laminated on each other, and are fixed and held on an upper fixing face of the heat sink member 7. On the upper and lower fixing faces of the middle holder 30, the upside and downside semiconductor-type light sources 5U and 5D are fixed and held, respectively.

Figure 2:
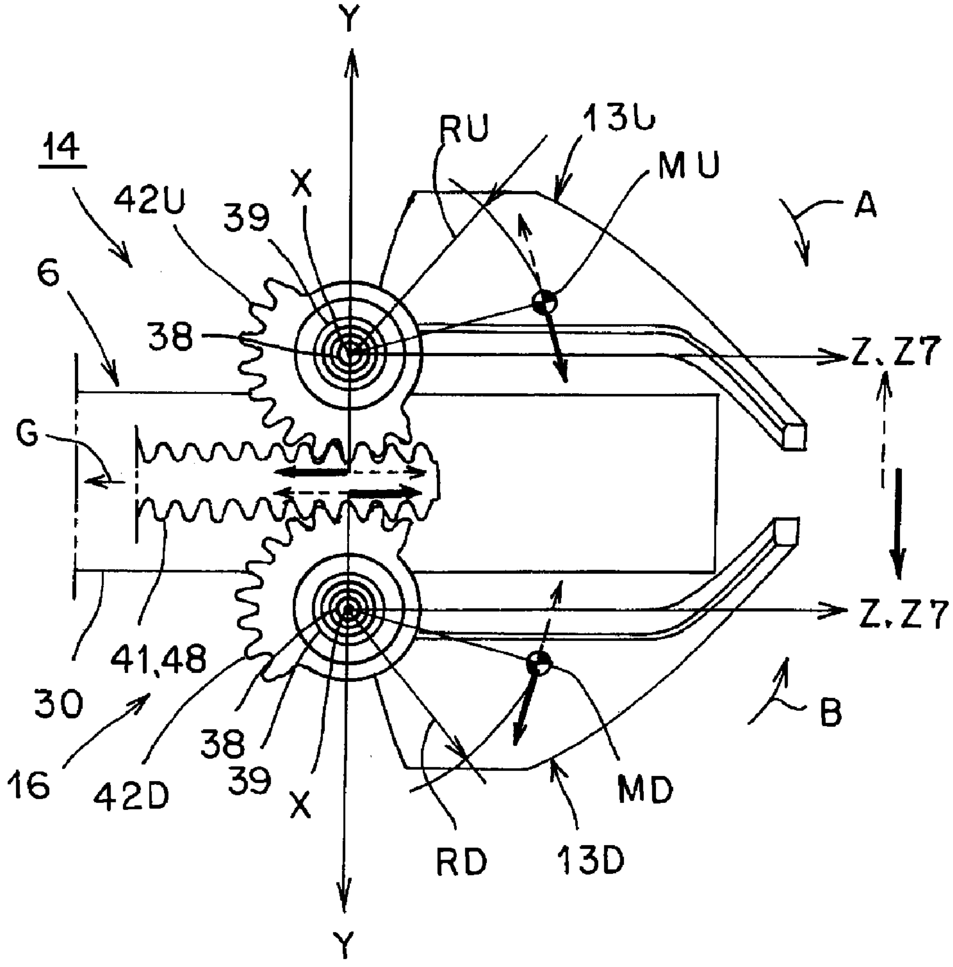
FIG. 2 is a side view showing the essential parts when the upside movable reflector and the downside movable reflector are positioned in the first location, similarly.
Figure 3:
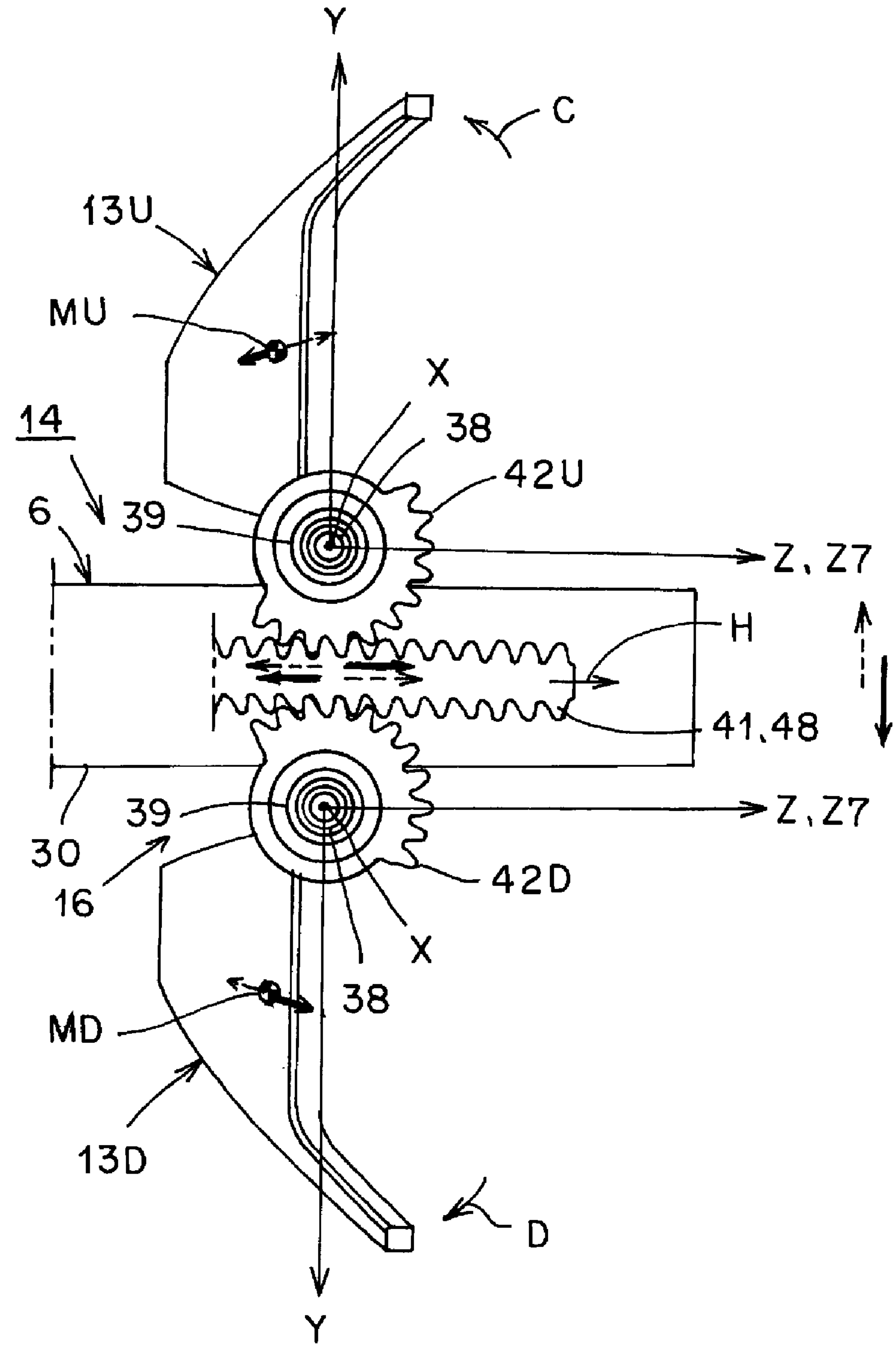
FIG. 3 is a side view showing the essential parts when the upside movable reflector and the downside movable reflector are positioned in a second location, similarly.

A rotary shaft 38 is integrally provided in the horizontal-axis X direction at a respective one of the left and right sides of the upper and lower movable reflectors 13U and 13D. The rotary shaft 38 is rotatably mounted around the horizontal axis X on a respective one of the receptacles 35 and 37 of the upper and lower holders 31 and 32. As a result, the upper and lower movable reflectors 13U and 13D are rotatably mounted on the holder 6 around the horizontal axis X. As shown in FIGS. 2 and 3, masses of the upper and lower movable reflectors 13U and 14D are equal or substantially equal to each other. In addition, a distance RU from a gravity MU to a rotational center of the upper movable reflector 13U is equal or substantially equal to a distance RD from a gravity MD to a rotational center (horizontal axis X) of the lower movable reflector 13D.

The drive unit 14, as shown in FIGS. 1 to 6, is made up of: a motor 15 serving as a drive source; a drive force transmission mechanism 16; and a spring 19 for movable reflector restoration. As the motor 15, for example, a brush-equipped DC motor, a brushless DC motor, a stepping motor or the like is used. The motor 15 is accommodated and held in the holder 6, namely the accommodation hole 33 of the middle holder 30, the accommodation opening 34 of the upper holder 31, and the accommodation opening 36 of the lower holder 32 and is directly fixed and held on the upper fixing face of the heat sink member 7. In this manner, a heat generated when power is distributed to the motor 15 can be radiated (dissipated) to the outside at the heat sink member 7.

The drive force transmission mechanism 16 is held at a lateral site (right side in the embodiment) relative to the upper and lower movable reflectors 13U and 13D and the upside and downside semiconductor-type light sources 5U and 5D, of the holder 6. In addition, the drive force transmission mechanism 16 is provided between the motor 15 and a respective one of the upside and downside movable reflectors 13U and 13D.

The drive force transmission mechanism 16 serves to rotate the upside and downside movable reflectors 13U and 13D between a first location (the location in the state shown in FIGS. 1, 2, 4, 7, 9, 11, and 13) and a second location (the location in the state shown in FIGS. 3, 5, 8, 10, 12, and 14) around the horizontal axis X relative to the holder 6. In addition, the drive force transmission mechanism 16 serves to transmit a rotational force (drive force, torque force) generated at the motor 15 to the upside and downside movable reflectors 13U and 13D, respectively, to thereby rotate the upside and downside movable reflectors 13U and 13D in the reverse directions, respectively. In other words, as shown in FIG. 2, when the upside and downside movable reflectors 13U and 13D are rotated from the second location to the first location, the upside movable reflector 13U is rotated in the clockwise direction indicated by the arrow A, whereas the downside movable reflector 13D are rotated in the counterclockwise direction indicated by the arrow B. In addition, as shown in FIG. 3, when the upside and downside movable reflectors 13U and 13D are rotated from the first location to the second location, the upside movable reflector 13U is rotated in the counterclockwise direction indicated by the arrow C, whereas the downside movable reflector 13D is rotated in the clockwise direction indicated by the arrow D.

The drive force transmission mechanism 16 is made up of: a pinion 40; a rack 41; an upside spur gear 42U; and a downside spur gear 42D. A rotary shaft 43 is fixed to the pinion 40. The rotary shaft 43 of the pinion 40 is fixed concentrically on a drive shaft (rotary axis) 44 of the motor 15. In addition, the upside and downside spur gears 42U and 42D are fixed to rotary shafts 38 situated at the right side of the upside and downside movable reflectors 13U and 13D, respectively.

The rack 41 is made of: a round bar portion 45 of a rear side portion; a round bar portion 46 of an intermediate portion; a first rack portion 47 provided on a top face between the round bar portion 45 of the rear side portion and the round bar portion 46 of the intermediate portion; and a second rack portion 48 provided on a respective one of the top and bottom faces of a front side portion. The rack 41 is held on the holder 6 via a rack bearing 49. In other word, the round bar portion 45 of the rear side and the round bar portion 46 of the intermediate portion, of the rack 41, are non-rotatably mounted on the rack bearing 49 and are movable mounted thereon in the direction indicated by the arrow G in FIGS. 2 and 4 and in the direction indicated by the arrow H in FIGS. 3 and 5. The rack bearing 49 serves to limit movement of the rack 41 and reduces a frictional load. The movement directions G, H of the rack are parallel to: a reference light axis (pseudo-light axis) Z of the upside and downside reflecting surfaces 2 and 2D of the fixed reflector 3, orthogonal to the horizontal axis X; and a reference light axis (pseudo-light axis) Z7 of the upside and downside reflecting surfaces 12U and 12D of the upside and downside movable reflectors 13U ad 13D.

Figure 4:
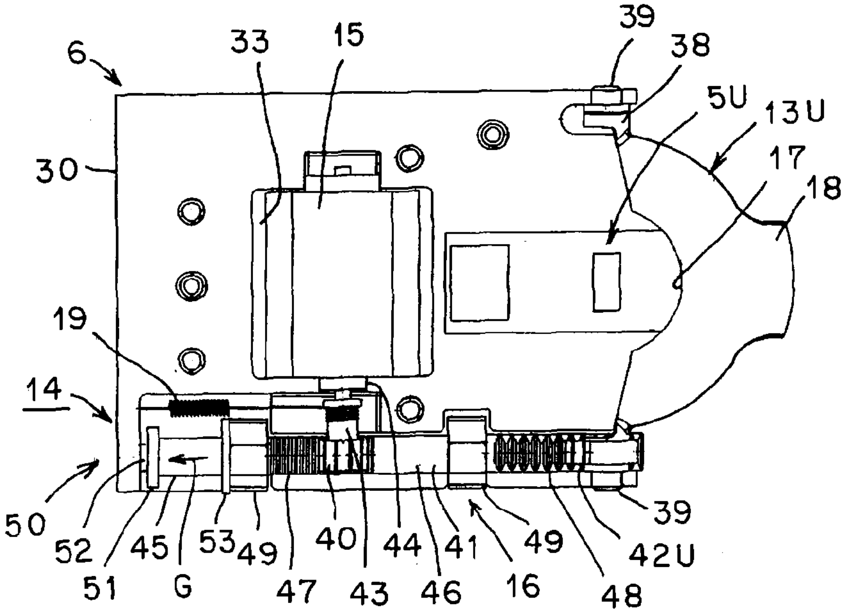
FIG. 4 is a plan view showing the essential parts when the upside movable reflector and the downside movable reflector are positioned in the first location, similarly.
Figure 5:
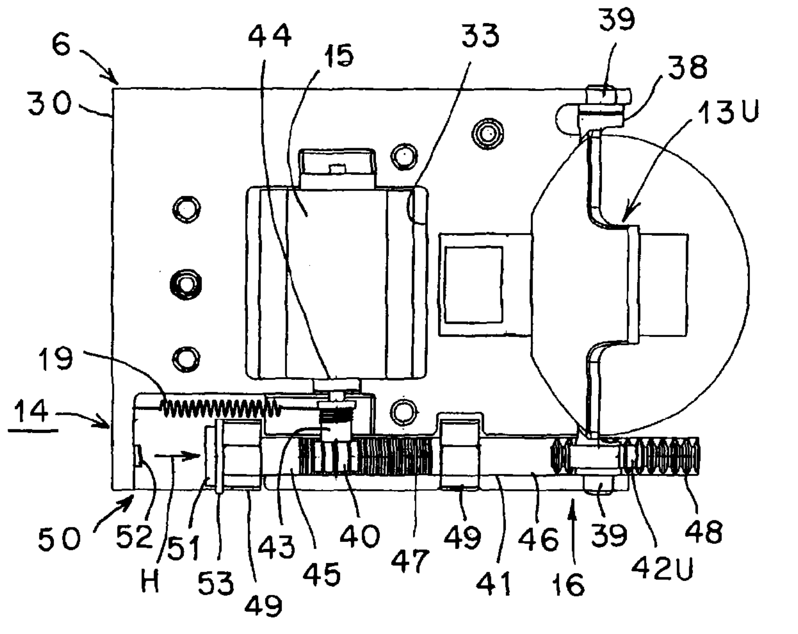
FIG. 5 is a plan view showing the essential parts when the upside movable reflector and the downside movable reflector are positioned in the second location, similarly.

A stopper mechanism 50, for braking the upside and downside movable reflectors 13U and 13D to the first and second locations, is provided between the holder 6 and the drive unit 14. The stopper mechanism 50 is made up of: a stopper portion 51 which is integrally provided at a rear end of the rack 41; a first abutment portion 52 for the first location braking, which is integrally provided on the middle holder 30; and a second abutment portion 53 for the second location braking, which is integrally provided at the rack bearing 49. As shown in FIG. 4, when the stopper portion 51 abuts against the first abutment portion 52, the upside and downside movable reflectors 13U and 13D brake in the first location. As shown in FIG. 5, when the stopper portion 51 abuts against the second abutment portion 53, the upside and downside movable reflectors 13U and 13D brake in the second location.

The spring 19 is provided between the holder 6 and the drive unit 14. In other word, one end of the spring 19 is fixed to the middle holder 30. On the other hand, the other end of the spring 19 is mounted on a connecting portion between the motor 15 as a drive source of the drive unit 14 and the drive force transmission mechanism 16, namely on the rotary shaft 43 of the pinion 40 (or the drive shaft 44 of the motor 15). The spring 19 is pulled to thereby hold a pulling force when the upside and downside movable reflectors 13U and 13D are positioned at the second position or when the upside and downside movable reflectors 13U and 13D rotate from the first location to the second location. Therefore, when the upside and downside movable reflectors 13U and 13D are positioned in the second location or when the upside and downside movable reflectors 13U and 13D rotate from the first location to the second location, if driving of the motor 15 stops, the upside and downside movable reflectors 13U and 13D are positioned at the second position or the upside and downside movable reflectors 13U and 13D rotating from the first location to the second location are restored to the first location.

Figure 16:
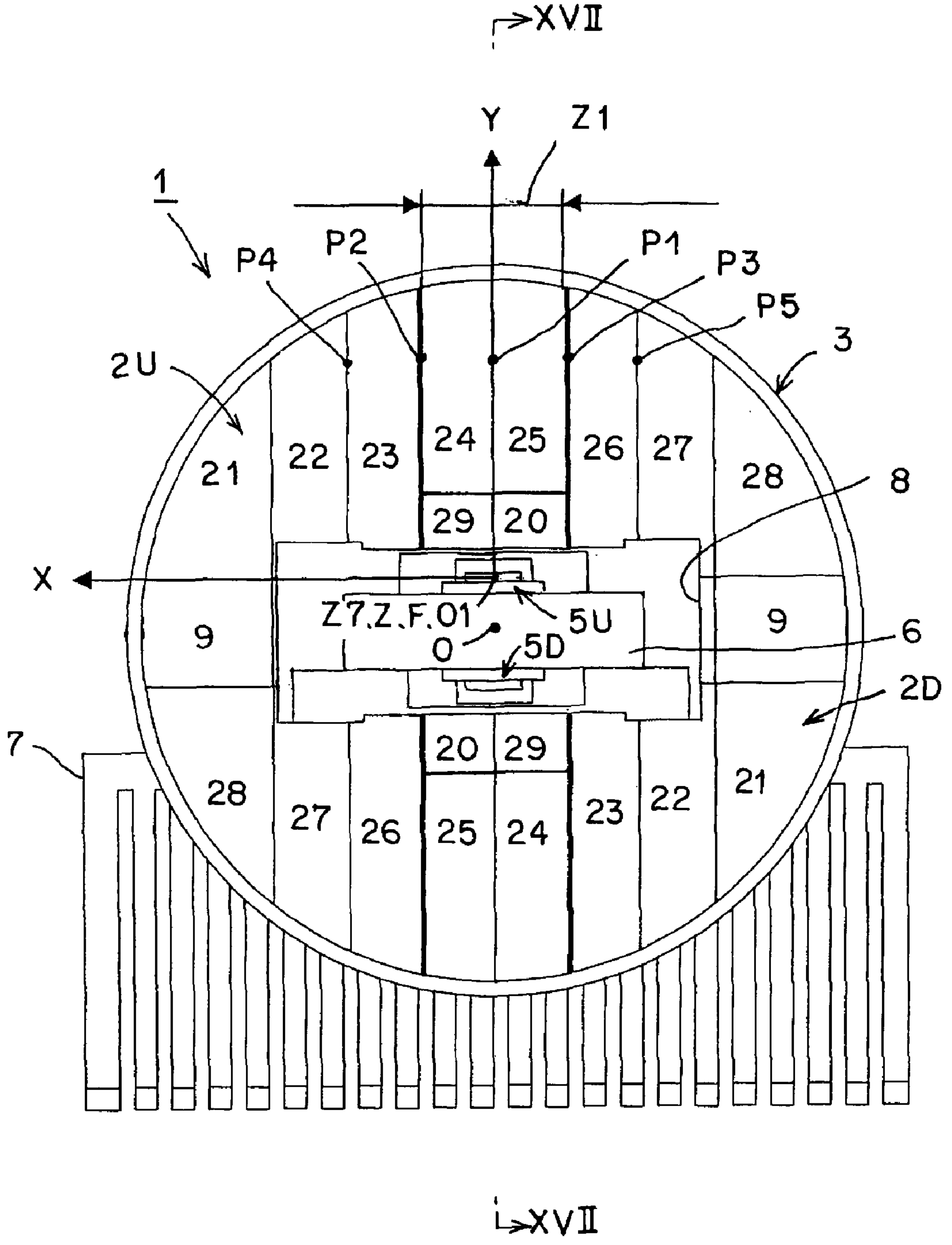
FIG. 16 is a front view showing essential parts when the upside movable reflector, the downside movable reflector, and the drive unit are removed, similarly.

The upside reflecting surface 2U of the fixed reflector 3; the upside reflecting surface 12U of the upside movable reflector 13U; and the upside semiconductor-type light source 5U constitute an upside unit with a light emitting face of the light emitting chip 4 being oriented upward in a vertical-axis Y direction. In addition, the downside reflecting surface 2D of the fixed reflector 3; the downside reflecting surface 12D of the downside movable reflector 13D; and the downside semiconductor-type light source 5D constitute a downside unit with a light emitting face of the light emitting chip 4 being oriented downward in the vertical-axis Y direction. The upside units 2U, 5U, 12U, 13U and the downside units 2D, 5D, 12D, 13D, as shown in FIG. 16, are disposed in a point-symmetrical state around a point O. A reflecting surface design of the upside reflecting surfaces 2U, 12U and a reflecting surface design of the downside reflecting surfaces 2D, 12D, are not merely point-symmetrical (inverted).

The fixed reflector 3 is made up of an optically opaque resin member, for example. The fixed reflector 3 is substantially shaped like a rotational parabola with an axis passing through the point-symmetrical point O serving as a rotational axis. A front side of the fixed reflector 3 is opened in a substantially circular shape. The size of an opening at the front side of the fixed reflector 3 is about 100 mm or less in diameter, preferably about 50 mm or less. On the other hand, a rear side of the fixed reflector 3 is closed. A transversely elongated, substantially rectangular window portion 8 is provided at an intermediate part of the closed portion of the fixed reflector 3. The holder 6 is inserted into the window portion 8 of the fixed reflector 3. The fixed reflector 3 is fixed and held at the holder 6 at the outside (rear side) of the closed portion.

Of the inside (front side) of the closed portion of the fixed reflector 3, the upside and downside reflecting surfaces 2U and 2D are provided at the upside and downside of the window portion 8, respectively. The upside and downside reflecting surfaces 2U and 2D, made of parabola-based free curved faces (NURBS-curved faces), have a reference focal point (pseudo-focal point) and a reference light axis (pseudo-light axis) Z. A reflection-free surface 9 is between the upside and downside reflecting surfaces 2U and 2D, and is provided at a respective one of the left and right sides of the window portion 8, of the inside (front side) of the closed portion of the fixed reflector 3.

The upside and downside reflecting surfaces 2U and 2D of the fixed reflector 3 are made up of: a reflecting surface for low beam, forming the light distribution pattern LP for low beam and the light distribution pattern LP1 for dimming low beam; and first and second reflecting surfaces for high beams, forming the first and second light distribution patterns HP1 and HP2 for high beams.

The upper and lower movable reflectors 13U and 13D are made up of an optically opaque resin member or the like, for example. The upper and lower movable reflectors 13U and 13D that are positioned in the second location, are substantially shaped like a rotational parabola form with an axis passing through the point-symmetrical point O serving as a rotational axis. The front side of the upper and lower movable reflectors 13U and 13D that are positioned in the second location is opened in a substantially circular shape. The size i.e., square measure, of the opening at the front side of the upside and downside movable reflectors 13U and 13D, is smaller that the size, i.e., square measure, of the opening at the front side of the fixed reflector 3 (about 100 mm or less in diameter, preferably about 50 mm or less).

A semicircular through hole 17 is provided at the central part of a respective one of the upside and downside movable reflectors 13U and 13D. Rectangular visor portions 18 are integrally provided at the intermediate portions of the peripheral portions of the upside and downside movable reflectors 13U and 13D, respectively. The upside and downside reflecting surfaces 12U and 12D are provided on faces opposite to the upside and downside semiconductor-type light sources 5U and 5D of the upside and downside movable reflectors 13U and 13D, respectively. The upside and downside reflecting surfaces 12U and 12D made of parabola-based free curved faces (NURBS-curved faces) have a reference focal point (pseudo-focal point) F1 and a reference light axis (pseudo-light axis) Z7.

The upside and downside reflecting surfaces 2U and 2D, of the upside and downside movable reflectors 13U and 13D, are made of a third reflecting surface for high beam, forming the third light distribution pattern HP3 for high beam.

Figure 18:
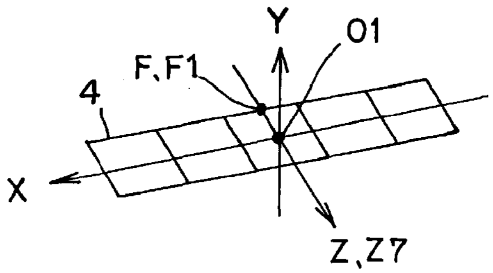
FIG. 18 is an explanatory perspective view showing a relative position relationship between a center of a light emitting chip and a reference focal point of a reflecting surface, similarly.
Figure 19:
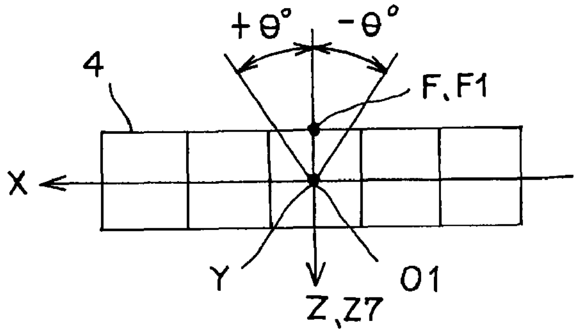
FIG. 19 is an explanatory plan view showing the relative position relationship between the center of the light emitting chip and the reference focal point of the reflecting surface, similarly.

The semiconductor-type light sources 5U, 5D are made up of: a board 10: the light emitting chip 4 provided on the board 10; and a sealing resin member 11 shaped like a thin rectangular prism, for sealing the light emitting chip 4. The light emitting chip 4, as shown in FIGS. 18 and 19, is formed in such a manner that five square chips are arranged in the horizontal-axis X direction. One rectangular chip may be used instead.

A center O1 of the light emitting chip 4 is positioned at or near reference focal points F, F1 of the reflecting surfaces 2U, 2D, 12U, 12D, and is positioned on reference light axes Z, Z7 of the reflecting surfaces 2U, 2D, 12U, 12D. In addition, a light emitting face of the light emitting chip 4 (the face opposite to the face opposing to the board 10) is oriented in the vertical-axis Y direction. In other words, the light emitting face of the light emitting chip 4 of the upside semiconductor-type light source 5U is oriented upward in the vertical-axis Y direction. On the other hand, a light emitting face of the light emitting chip 4 of the downside semiconductor-type light source 5D is oriented downward in the vertical-axis Y direction. Further, a long side of the light emitting chip 4 is parallel to the horizontal axis X orthogonal to the reference light axes Z, Z7 and the vertical axis Y. The horizontal axis X passes through the center O1 or its proximity, of the light emitting chip 4 (between the center O1 of the light emitting chip 4 and the long side at the rear side of the light emitting chip 4 and on the long side at the rear side of the light emitting chip 4, in the embodiment), or alternatively, passes through the reference focal points F, F1 or its proximity, of the reflecting surfaces 2U, 2D, 12U, 12D.

The horizontal axis X, the vertical axis Y, and the reference light axes Z, Z7 constitute an orthogonal coordinate system (X-Y-Z orthogonal coordinate system) with the center O1 of the light emitting chip 4 serving as an origin. In the horizontal axis X, in the case of the upside units 2U, 5U, 12U, the right side corresponds to a positive direction and the left side corresponds to a negative direction, and in the case of the downside units 2D, 5D, 12D, the left side correspond to a positive direction and the right side corresponds to a negative direction. In the vertical axis Y, in the case of the upside units 2U, 5U, 12U, the upside corresponds to a positive direction and the downside corresponds to a negative direction; and in the case of the downside units 2D, 5D, 12D, the downside corresponds to a positive direction and the upside corresponds to a negative direction. In the reference light axes Z, Z7, the front side corresponds to a positive direction and the rear side corresponds to a negative direction, in both of the upside units 2U, 5U and the downside units 2D, 5D.

The reflecting surfaces 2U, 2D of the fixed reflector 3 and the reflecting surfaces 12U, 12D of the movable reflectors 13U, 13D are made up of parabola-based free curved faces (NURBS-curved faces). A reference focal point F of the reflecting surfaces 2U, 2D of the fixed reflector 3 and a reference focal point F1 of the reflecting surfaces 12U, 12D of the movable reflectors 13U, 13D are coincident or substantially coincident with each other; are positioned on the reference light axes Z, Z7 and between the center O1 of the light emitting chip 4 and the long side at the rear side of the light emitting chip 4; and are positioned at the long side at the rear side of the light emitting chip 4. In addition, a reference focal-point distance of the reflecting surfaces 2U, 2D of the fixed reflector 3 is from about 10 mm to 18 mm, and is longer than a reference focal-point distance F1 of the reflecting surfaces 12U, 12D of the movable reflectors 13U, 13D.

The reference light axis Z of the reflecting surfaces 2U, 2D of the fixed reflector 9 and the reference light axis Z7 of the reflecting surfaces 12U, 12D of the movable reflectors 13U, 13D when the reflectors are positioned in the second location are coincident or substantially coincident with each other and are orthogonal to the horizontal axis X, and further, pass through the center O1 or its proximity, of the light emitting chip 4. The reference light axis Z7 of the reflecting surfaces 12U, 12D of the movable reflectors 13U, 13D are forward from the center O1 or its proximity, of the light emitting chip 4 and are upward relative to the reference light axis Z of the reflecting surfaces 2U, 2D of the fixed reflector 9.

Figure 11:
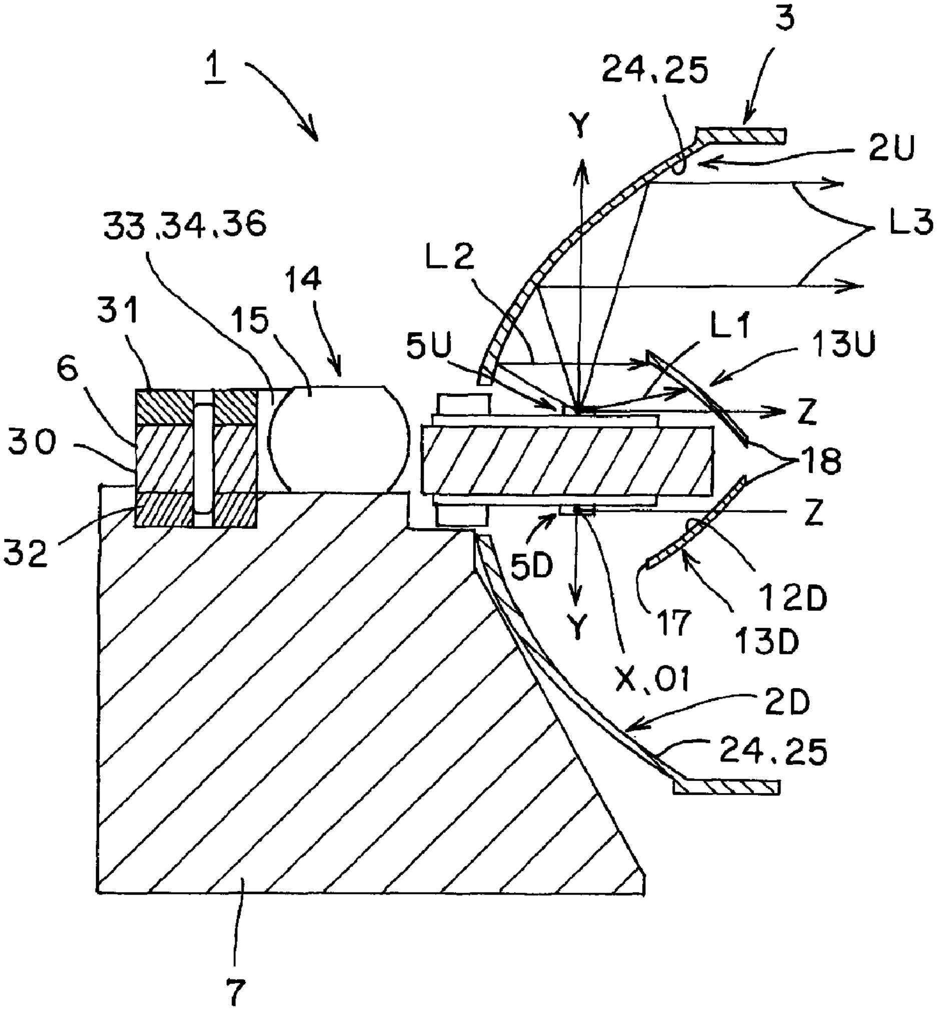
FIG. 11 is a cross-sectional view taken along the line XI-XI in FIG. 9 showing an optical path, similarly.

When the movable reflectors 13U, 13D are positioned in the first location, as shown in FIG. 11, light L1 radiated from the light emitting chip 4 to the first reflecting surface for high beam, of the fixed reflector 3, and reflection light L2 reflected on the second reflecting surface for high beam, of the fixed reflector 3 are shaded by means of the movable reflectors 13U, 13D. As a result, reflection light L3 which has been reflected on the reflecting surface for low beam, of the fixed reflector 3, is illuminated toward a forward direction of a vehicle, as the light distribution pattern LP for low beam (light distribution pattern for passing) shown in FIG. 26.

Figure 12:
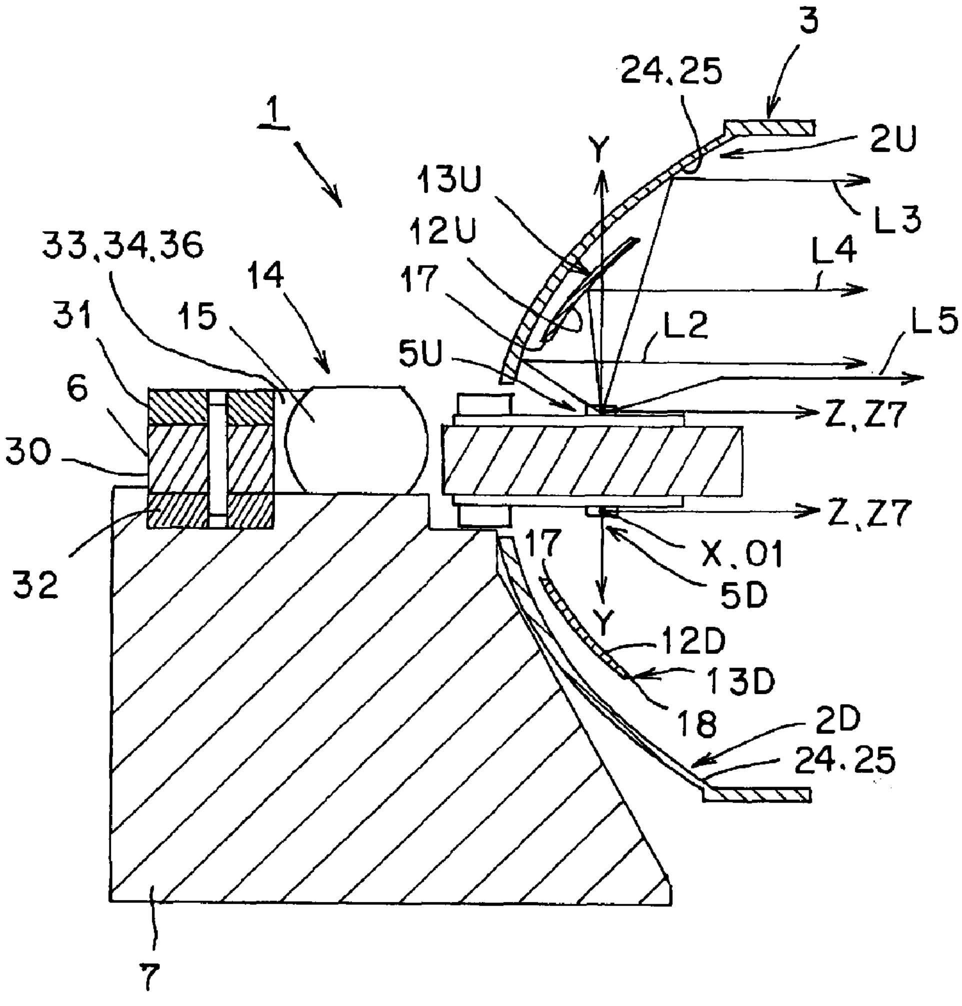
FIG. 12 is a cross-sectional view taken along the line XII-XII in FIG. 10 showing an optical path, similarly.
Figure 27:
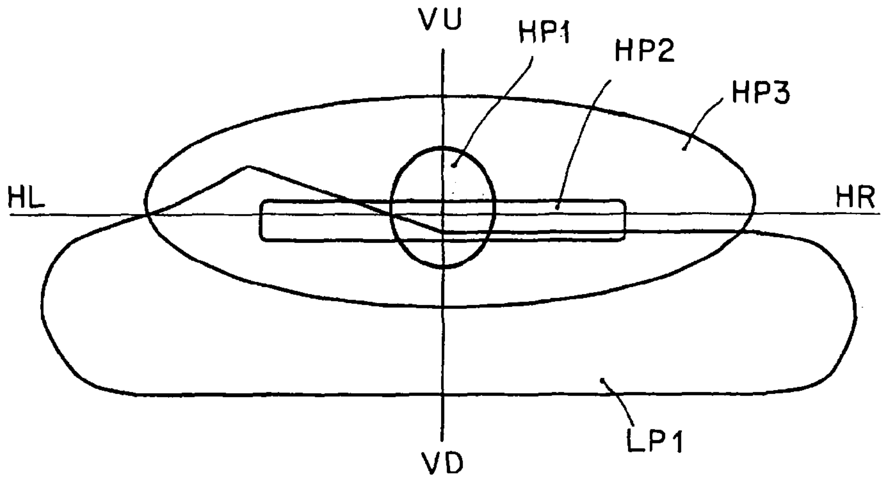
FIG. 27 is an explanatory view showing a light distribution pattern for high beam.

When the movable reflectors 13U, 13D are positioned in the second location, as shown in FIG. 12, reflection light L4 which has been reflected on the third reflecting surface for high beam (the reflecting surfaces 12U, 12D) of the movable reflectors 13U, 13D are illuminated toward the forward direction of the vehicle, as the third light distribution pattern HP3 for high beam, shown in FIG. 27; reflection light beams L5, L2 which have been reflected on the first and second reflecting surfaces for high beams, of the fixed reflector 3, are illuminated toward the forward direction of the vehicle, as the first and second light distribution patterns HP1 and HP2 for high beams, shown in FIG. 27; and further, reflection light L3 which has been reflected on the reflecting surface for low beam, of the fixed reflector 3, are illuminated toward the forward direction of the vehicle, as the light distribution pattern LP1 for dimming low beam, shown in FIG. 27, respectively. As shown in FIG. 27, a light distribution pattern for high beam (cruising light distribution pattern) is formed by the first, second, and third light distribution patterns HP1, HP2, and HP3 for high beams; and the light distribution pattern LP1 for dimming low beam, and is illuminated toward the forward direction of the vehicle.

Figure 14:
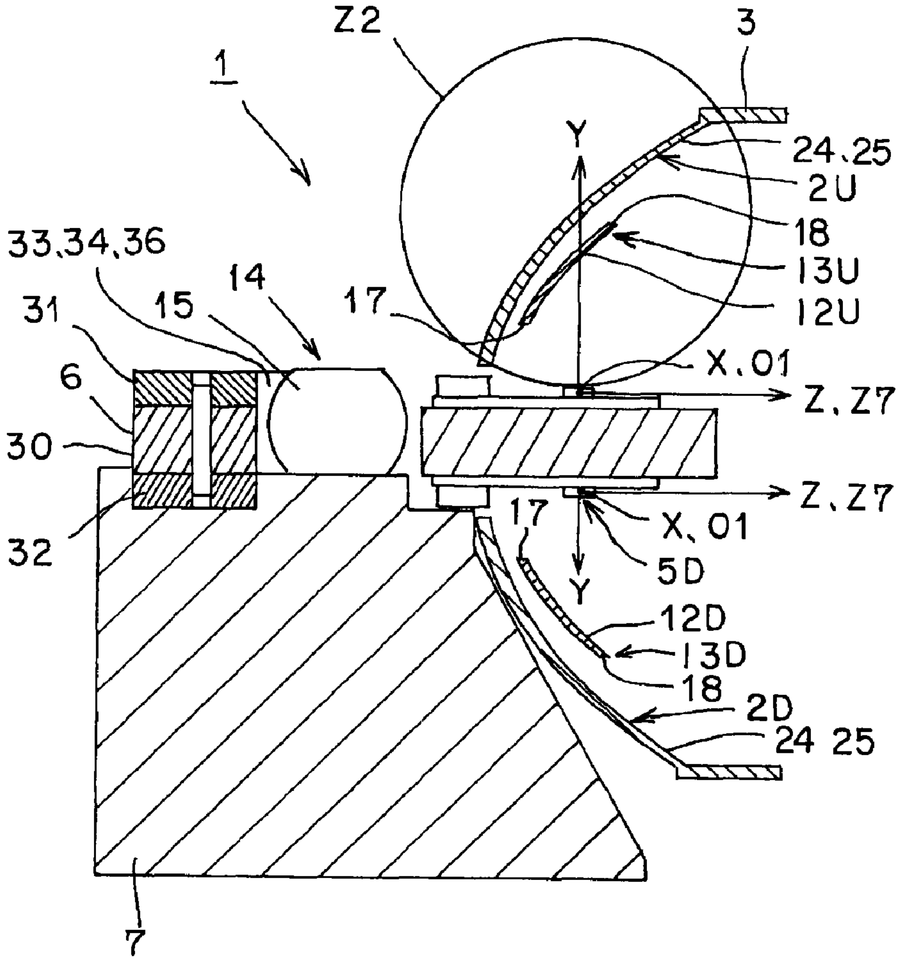
FIG. 14 is a cross-sectional view taken along the line XII-XII in FIG. 10 showing the energy distributions of the semiconductor-type light source, similarly.

When the movable reflectors 13U, 13D are positioned in the second location, as shown in FIG. 12, a part of the light radiated from the light emitting chip 4 to the reflecting surface for low beam, of the fixed reflector 3, and reflect reflection light L4 on the third reflecting surface for high beam (the reflecting surfaces 12U, 12D) of the movable reflectors 13U, 13D are shaded by means of the movable reflectors 13U, 13D. In other word, a part of the light from the light emitting chip 4 is changed over from the light distribution pattern LP1 for dimming low beam to the third light distribution pattern HP3 for high beam. Therefore, a light quantity of the light distribution pattern LP1 for dimming low beam, shown in FIG. 27, is smaller than that of the light distribution pattern LP for low beam, shown in FIG. 26. On the other hand, when the movable reflectors 13U, 13D are positioned in the first location, the light beams from the light emitting chip 4, which has been shaded by means of the movable reflectors 13U, 13D, are utilized as the first light distribution pattern HP1 for high beam and the second light distribution pattern HP2 for high beam. At this time, as shown in FIG. 14, the reflecting surfaces 12U, 12D of the movable reflectors 13U, 13D are positioned in a range Z3 with high energy in an energy distribution Z2 of the light emitting chip 4. As a result, from the comprehensive point of view, a respective one of the light quantities of the light distribution patterns for high beams HP1, HP2, HP3, LP1 (cruising light distribution patterns), shown in FIG. 27, becomes larger than that of the light distribution pattern LP for low beam (light distribution pattern for passing), shown in FIG. 26.

The reflecting surfaces 2U, 2D are divided into eight sections in the vertical-axis Y direction, and are made up of segments 21, 22, 23, 24, 25, 26, 27, 28, 29, 20, and a respective one of the central two segments is divided into two sections in the horizontal-axis X direction. The second segment 22, the third segment 23, the fourth segment 24, the fifth segment 25, the sixth segment 26, and the seventh segment 27, of the central and peripheral parts, constitute the reflecting surface for low beam. The first and eighth segments 21 and 28 of both ends constitute the first reflecting surface for high beam. Further, a ninth segment 29 and a tenth segment 20 of the central part constitute the second reflecting surface for high beam.

On the reflecting surface for low beam, the fourth segment 24 of the central part constitutes a first reflecting surface. In addition, the fifth segment 25 of the central part constitutes a second reflecting surface. Further, the second segment 22, the third segment 23, the sixth segment 26, and the seventh segments 27 of the end parts constitute a third reflecting surface.

Figure 20:
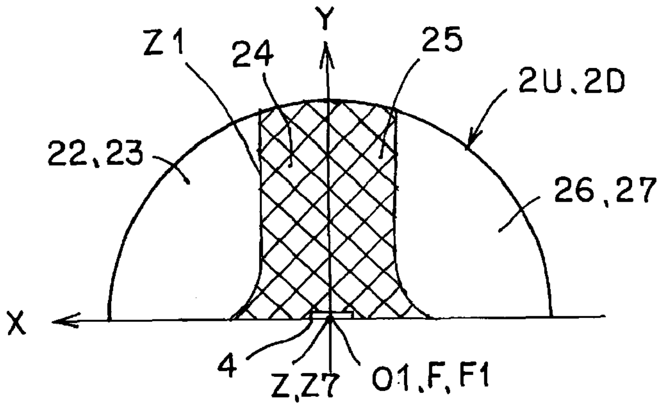
FIG. 20 is an explanatory front view showing a range of providing a first reflecting surface made of a fourth segment and a second reflecting surface made of a fifth segment.

The fourth segment 24 of the first reflecting surface and the fifth segment 25 of the second reflecting surface, of the central part, are provided in the range Z1 indicated by two longitudinal thick solid lines in FIG. 16, the range Z1 covered with checkered diagonal line in FIG. 20, namely in the range Z1 within a latitude angle of ±40 degrees (±θ degrees in FIG. 19) from the center O1 of the light emitting chip 4. The second segment 22, the third segment 23, the sixth segment 26, and the seventh segment 27 of the third reflecting surface, of the end parts, are provided in a white-ground range in FIG. 20 other than the range Z1, namely in the range beyond the latitude angle of ±40 degrees from the center O1 of the light emitting chip 4.

Hereinafter, referring to FIGS. 21, 22, and 23, a description will be given with respect to a reflection image (screen map)

of the light emitting chip 4 shaped like a planar rectangle, the reflection image being obtained in a respective one of segments 22 to 27 of the reflecting surface for low beam, among the reflecting surfaces 2U, 2D. In other words, at a boundary P1 between the fourth segment 24 and the fifth segment 25, as shown in FIG. 21, a reflection image I1 of the light emitting chip 4 with a tilt angle of about 0 degree is obtained relative to the horizontal line HL-HR of a screen. In addition, at a boundary P2 between the third segment 23 and the fourth segment 24, as shown in FIG. 22, a reflection image 12 of the light emitting chip 4 with a tilt angle of about 20 degrees is obtained relative to the horizontal line HL-HR of the screen. Further, at a boundary P3 between the fifth segment 25 and the sixth segment 26, as shown in FIG. 22, a reflection image I3 of the light emitting chip 4 with a tilt angle of about 20 degrees is obtained relative to the horizontal line HL-HR of the screen. Furthermore, at a boundary P4 between the second segment 22 and the third segment 23, as shown in FIG. 23, a reflection image I4 of the light emitting chip 4 with a tilt angle of 40 degrees is obtained relative to the horizontal line HL-HR of the screen. Still furthermore, at a boundary P5 between the sixth segment 26 and the seventh segment 27, as shown in FIG. 23, a reflection image I5 of the light emitting chip 4 with a tilt angle of about 40 degrees is obtained relative to the horizontal line HL-HR of the screen.

Figure 21:
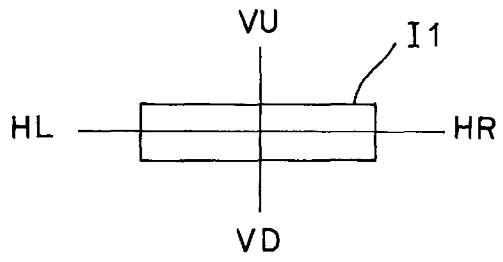
FIG. 21 is an explanatory view showing a reflecting image of a light emitting chip, obtained at a point P1 of a reflecting surface, similarly.
Figure 22:
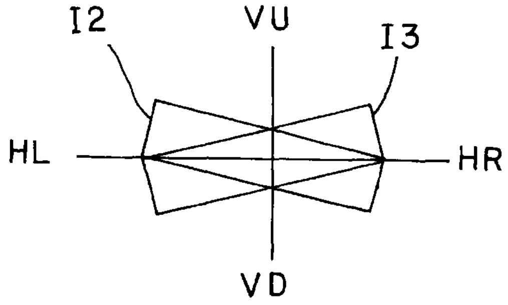
FIG. 22 is an explanatory view showing a reflecting image of a light emitting chip, obtained at points P2, P3 of the reflecting surface, similarly.
Figure 23:
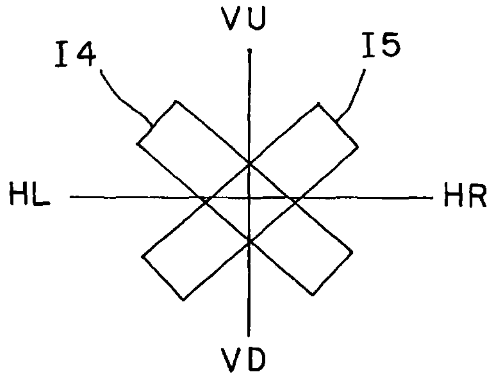
FIG. 23 is an explanatory view showing a reflecting image of a light emitting chip, obtained at points P4, P5 of the reflecting surface, similarly.

As a result, in the fourth segment 24 for the reflecting surface for low beam, reflection images from the reflection image I1 with the tilt angle of about 0 degree, shown in FIG. 21, to the reflection image I2 with the tilt angle of about 20 degrees, shown in FIG. 22, are obtained. In addition, in the fifth segment 25 of the reflecting surface for low beam, reflection images from the reflection image I1 with the tilt angle of about 0 degree, shown in FIG. 21, to the reflection image I3 with the tilt angle of about 20 degrees, shown in FIG. 22, are obtained. Further, in the third segment 23 of the reflecting surface for low beam, reflection images from the reflection image I2 with the tilt angle of about 20 degrees, shown in FIG. 22, and the reflection image I4 with the tilt angle of about 40 degrees, shown in FIG. 23, are obtained. Furthermore, in the sixth segment 26 of the reflecting surface for low beam, reflection images from the reflection image I3 with the tilt angle of about 20 degrees, shown in FIG. 22, and the reflection image I5 with the tilt angle of about 40 degree, shown in FIG. 23, are obtained. Still furthermore, in the second segment 22 and the seventh segment 27 of the reflecting surfaces for low beams, a reflection image with a tilt angle of about 40 degrees or more is obtained.

The reflection images from the reflection images I1 with the tilt angle of about 0 degree, shown in FIG. 21, and the reflection images I2, 13 with the tilt angle of about 20 degrees, shown in FIG. 22, are reflection images which are optimal to form a light distribution including an oblique cutoff line CL1 of the light distribution pattern LP for low beam. In other words, this is because it is easy to take reflection images from the reflection image I1 with the tilt angle of about 0 degree and the reflection images I2, I3 with the tilt angle of about 20 degrees along the oblique cutoff line CL1 with a tilt angle of about 15 degrees. On the other hand, the reflection images with the tilt angle of about 20 degrees, including the reflection images 14, I5 with the tilt angle of about 40 degrees, shown in FIG. 23, are reflection images which are unsuitable to form a light distribution including the oblique cutoff line CL1 for the light distribution pattern LP for low beam. In other words, this is because, if the reflection image with the tilt angle of about 20 degrees or more is taken along the oblique cutoff line CL1 with the tilt angle of about 15 degrees, the light distribution becomes thick in the vertical direction, resulting in excessive short-distance light distribution (i.e., light distribution with lowered long-distance visibility).

Figure 13:
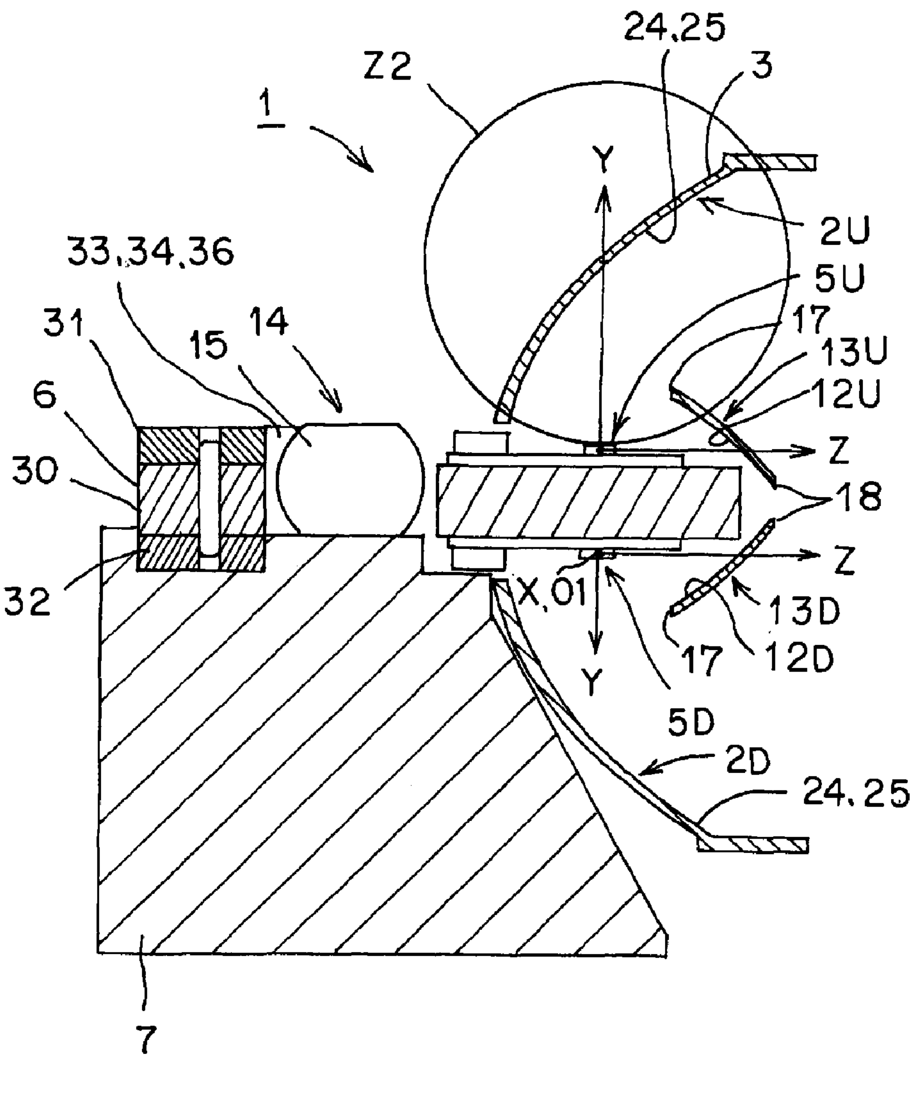
FIG. 13 is a cross-sectional view taken along the line XII-XII in FIG. 9 showing energy distributions of a semiconductor-type light source, similarly.
Figure 17:
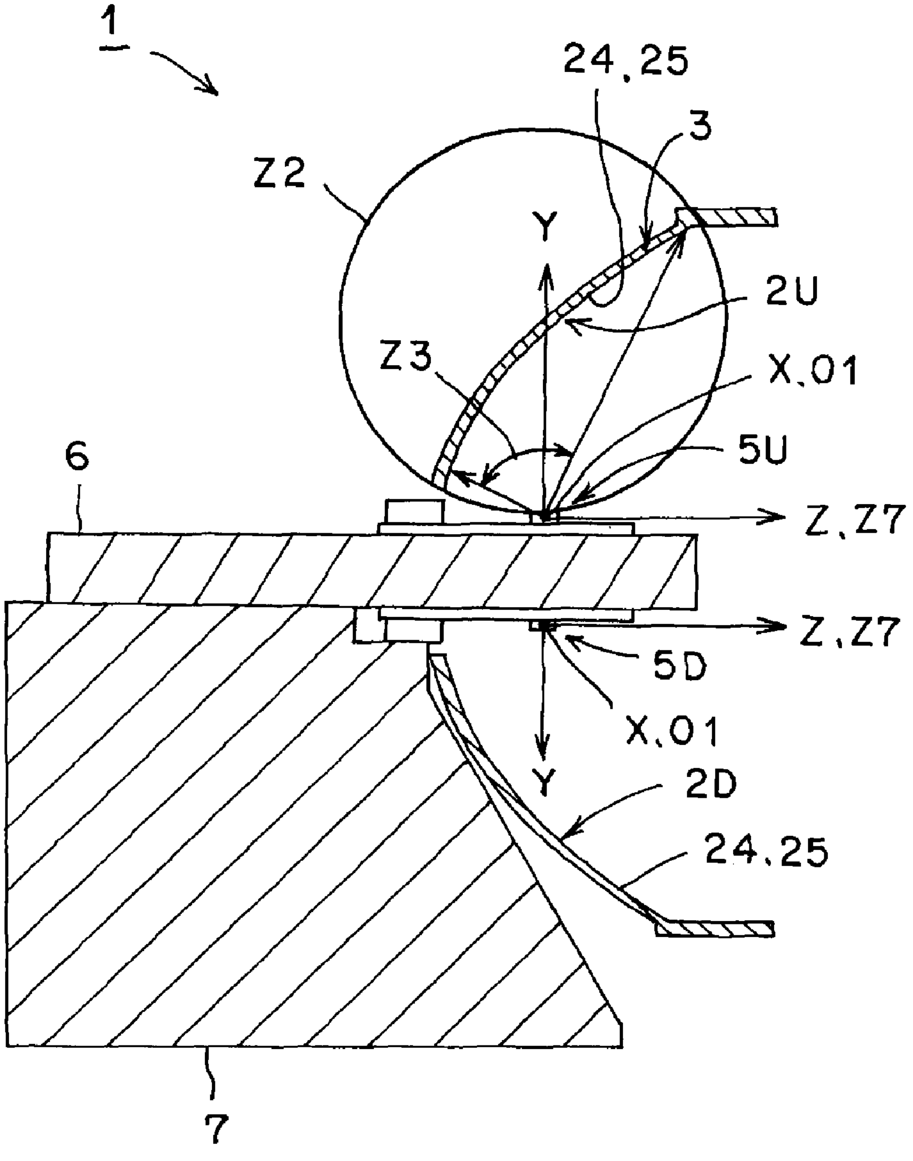
FIG. 17 is a cross-sectional view taken along the line XVII-XVII in FIG. 16, similarly.

In addition, light distribution in the oblique cutoff line CL1 is responsible for long-distance visible light distribution. Thus, it is necessary to form a high luminous intensity zone (high energy zone) for the light distribution in the oblique cutoff line CL1. Therefore, the fourth segment 24 of the first reflecting surface and the fifth segment 25 of the second reflecting surface, of the central part, as shown in FIG. 17, are included in the range Z3 of high energy in the energy distribution (Lambertian) Z2 of the light emitting chip 4. In FIGS. 13, 14, 17, the energy distribution of the downside semiconductor-type light source 5D is not shown.

From the foregoing description, a reflecting surface which is optimal to form the light distribution in the oblique cutoff line CL1 is determined by a relative relationship between: the range in which the reflection images I1, I2 with the tilt angle of 20 degrees or less are obtained from among the reflecting surfaces of parabola-based free curved faces; and the energy distribution (Lambertian) of the semiconductor-type light surfaces 5U, 5D. As a result, the reflecting surface that is optimal to form the light distribution in the oblique cutoff line CL1, i.e., the fourth segment 24 and the fifth segment 25 are provided in the range Z1 from the center O1 of the light emitting chip 4 to the longitude angle of ±40 degrees or less, equivalent to a range in which there are obtained the reflection images I1, I2 of the light emitting chip 4, with the tilt angle of about 20 degrees obtained by adding about 5 degrees to the tilt angle (about 15 degrees) of the oblique cutoff line CL1 and in the range Z3 with high energy in the energy distribution (Lambertian) Z2 of the light emitting chip 4.

Figure 26:
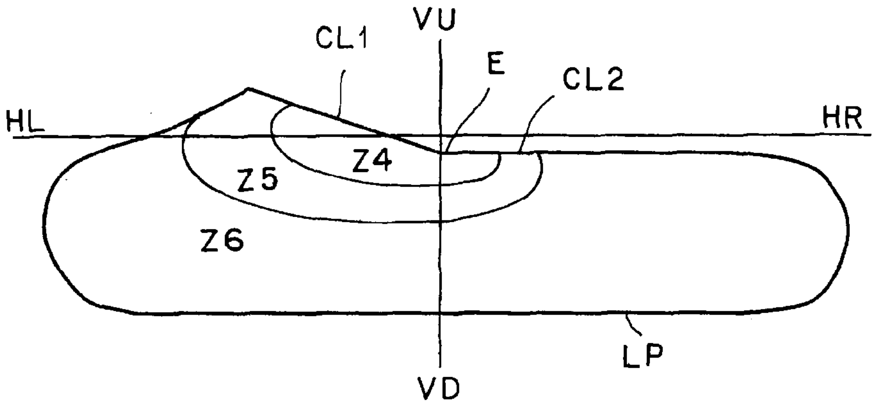
FIG. 26 is an explanatory view showing a light distribution pattern for low beam, having an oblique cutoff line and a horizontal cutoff line, similarly.

The first reflecting surface made of the fourth segment 24, as shown in FIGS. 24 and 26, are reflecting surfaces made of free curved faces of light-distributing and controlling the reflection images I1, I2 of the light emitting chip 4 in the range Z4 in the light distribution pattern LP for low beam, so that: the reflection images I1, I2 of the light emitting chip 4 do not run out of the oblique cutoff line CL1 and the horizontal cutoff line CL2; and so that a part of the reflection images I1, I2 of the light emitting chip 4 comes into substantial contact with the oblique cutoff line CL1 and the horizontal cutoff line CL2.

In addition, the second reflecting surface made of the fifth segment 5, as shown in FIGS. 25 and 26, are reflecting surfaces made of free curved faces of light-distributing and controlling the reflection images I1, I3 of the light emitting chip 4 in the range Z5 containing the range Z4 in the light distribution pattern LP for low beam, so that: the reflection images I1, I3 of the light emitting chip 4 do not run out of the oblique cutoff line CL1 and the horizontal cutoff line CL2; and a part of the reflection images I1, I3 of the light emitting chip 4 comes into substantial contact with the oblique cutoff line CL1 and the horizontal cutoff line CL2 or so that: the density of a group of the reflection images I1, I3 of the light emitting chip 4 becomes lower than that of a group of the reflection images I1, I2 of the light emitting chip 4 according to the first reflecting surface made of the fourth segment; and the group of the reflection images I1, I3 of the light emitting chip 4 contains that of the reflection images I1, I2 of the light emitting chip 4 according to the first reflecting surface made of the fourth segment 24. The density of a respective one of the reflection images I1, I2 of the light emitting chip 4 is equal or similarly equal to that of a respective one of the reflection images I1, I3 of the light emitting chip 4.

Further, the third reflecting surface made of the second segment 22, the third segment 23, the sixth segment 26, and the seventh segment 27, as shown in FIG. 26, is a reflecting surface made of a free curved face of light-distributing and controlling the reflection images I4, I5 of the light emitting chip 4 in a range Z6 containing the ranges Z4, Z5 in the light distribution pattern LP for low beam, so that: reflection images I4, I5 of the light emitting chip 4 are substantially included in the light distribution pattern LP for low beam; the density of a group of the reflection images I4, I5 of the light emitting chip 4 is lower than that of a group of the reflection images I1, I2 of the light emitting chip 4 according to the first reflecting surface made of the fourth segment 24 and that of a group of reflection images I1, I3 of the light emitting chip 4 according to the second reflecting surface made of the fifth segment 25; and the group of the reflection images I4, I5 of the light emitting chip 4 contains that of the reflection images I1, I2 of the light emitting chip 4 according to the first reflecting surface made of the forth segment 24 and that of the reflection images I1, I3 of the light emitting chip 4 according to the second reflecting surface made of the fifth segment 25.

The vehicle headlamp 1 in the embodiment is made of the above-described constituent elements, and hereinafter, functions of these constituent elements will be described.

First, the upside movable reflector 13U and the downside movable reflector 13D are positioned in the first location (the location in the state shown in FIGS. 1, 2, 4, 7, 9, 11, and 13). In other words, when power distribution to a motor 15 of a drive unit 14 is shut off, the upside and downside movable reflectors 13U and 13D are positioned in the first location due to a resilient action exerted by a spring force of a spring 19 and a stopper action of a stopper mechanism 50 (the state in which a stopper portion 51 is in abutment against a first abutment portion 52). At this time, a light emitting chip 4 of an upside semiconductor-type light source 5U and a downside semiconductor-type light source 5D is lit to emit light. The light is then radiated from the light emitting chip 4 of the upside and downside semiconductor-type light sources 5U and 5D.

Figure 6:
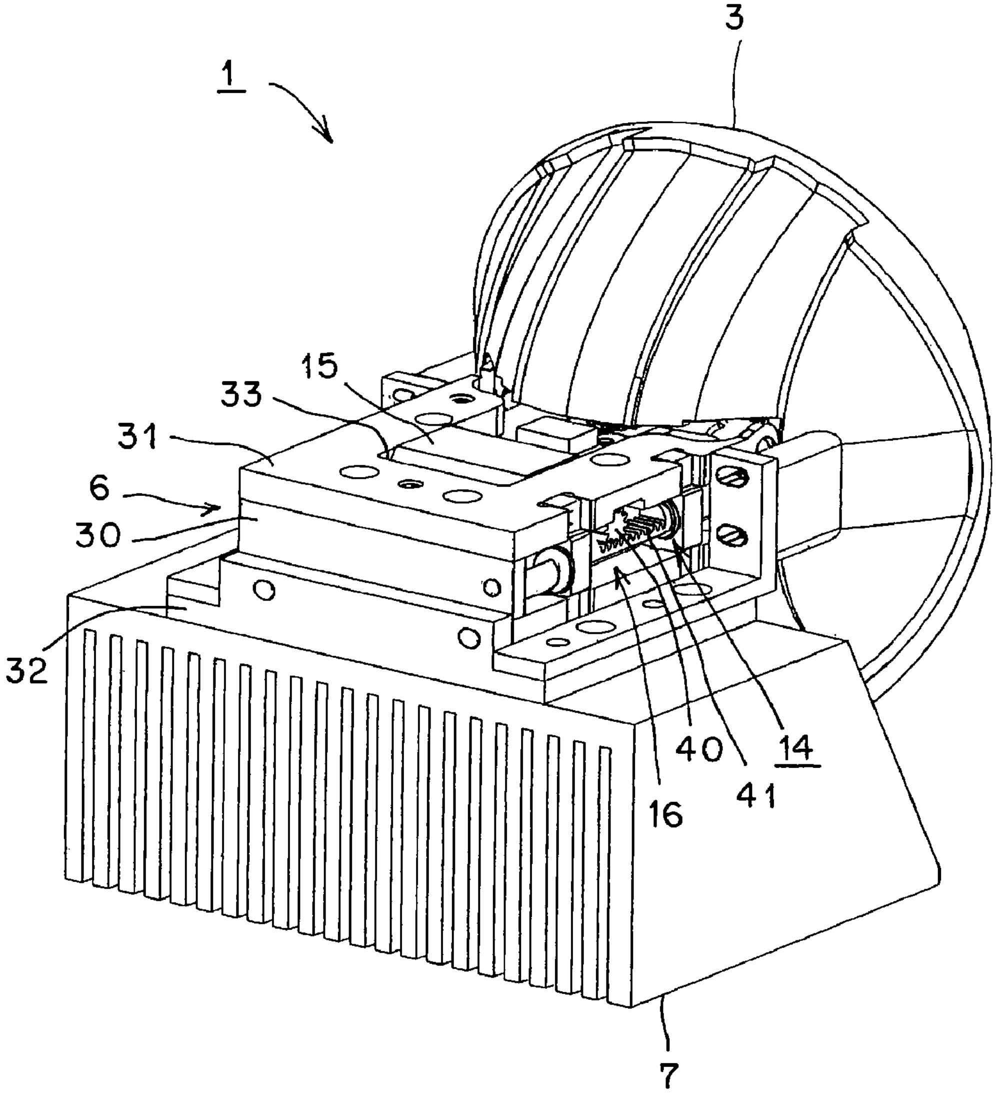
FIG. 6 is a perspective view showing a fixed reflector, a holder, a heat sink member, and a drive unit, similarly.
Figure 7:
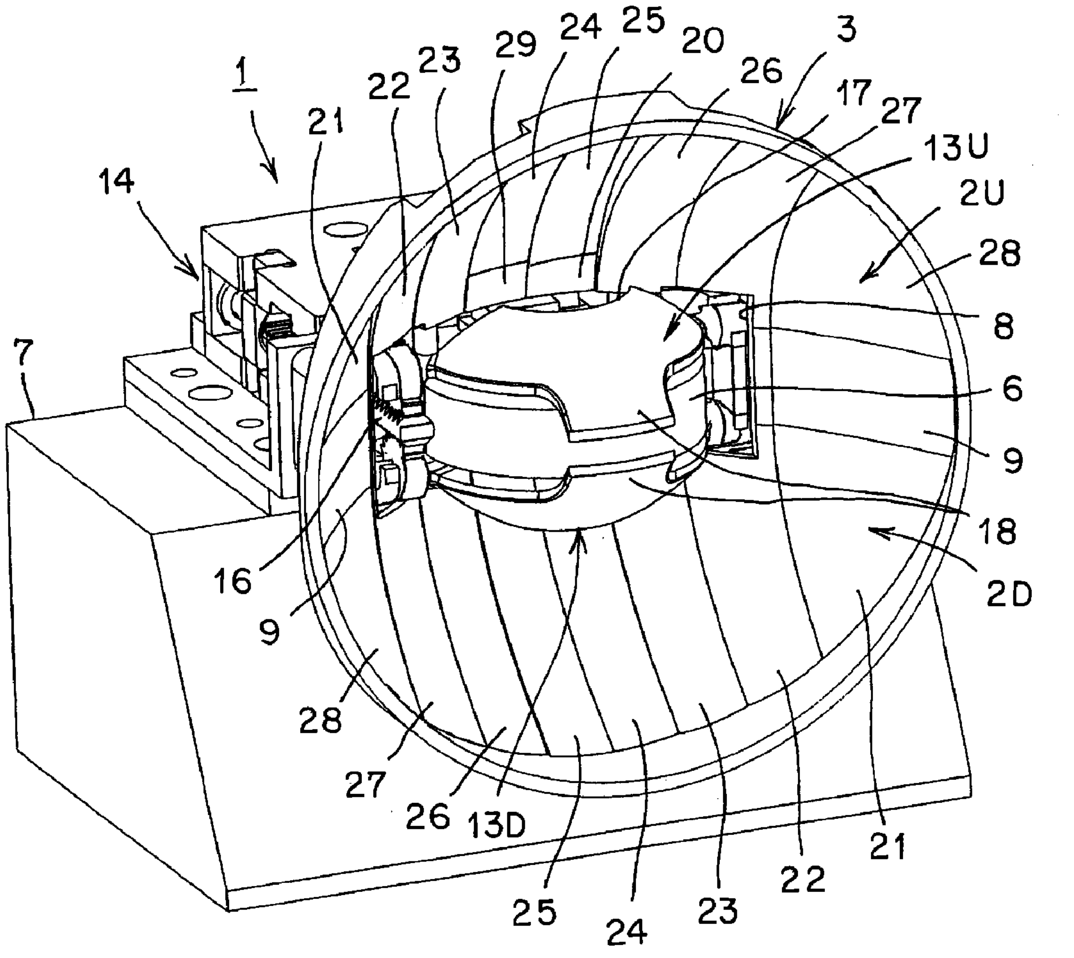
FIG. 7 is a perspective view showing the essential parts when the upside movable reflector and the downside movable reflector are positioned in the first location, similarly.
Figure 8:
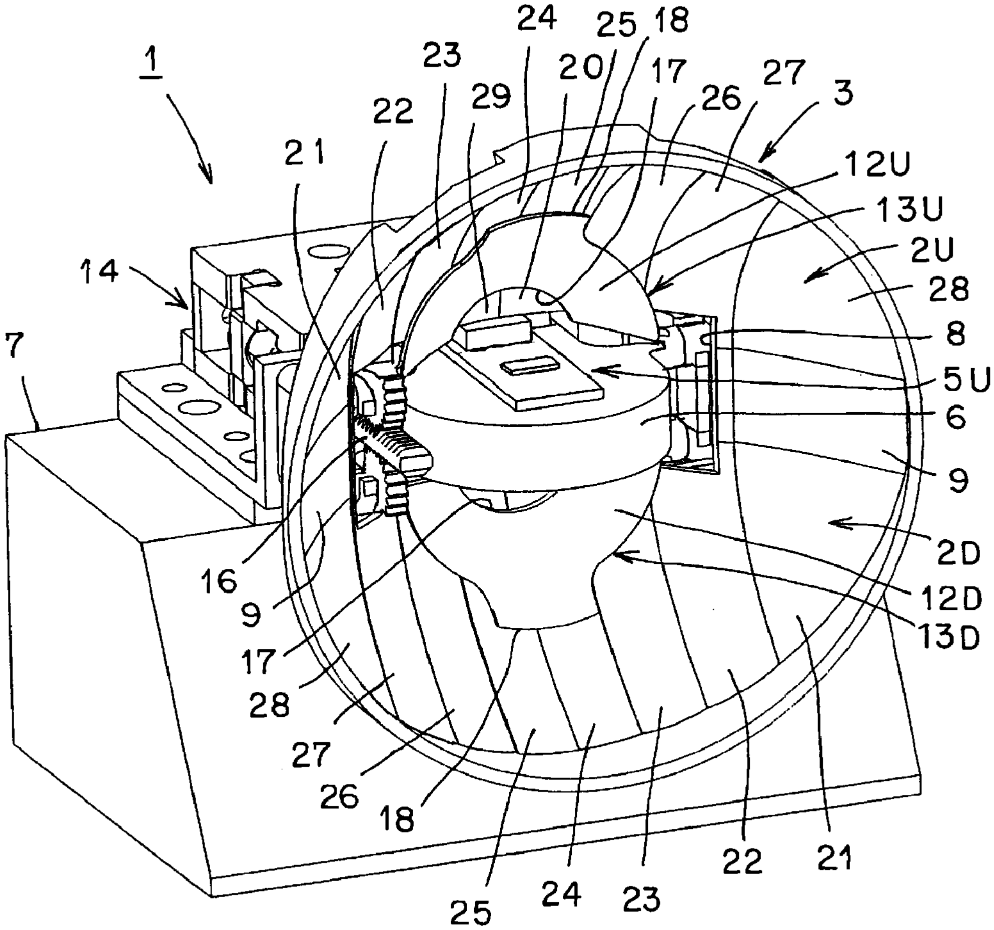
FIG. 8 is a perspective view showing the essential parts when the upside movable reflector and the downside movable reflector are positioned in the second location, similarly.
Figure 9:
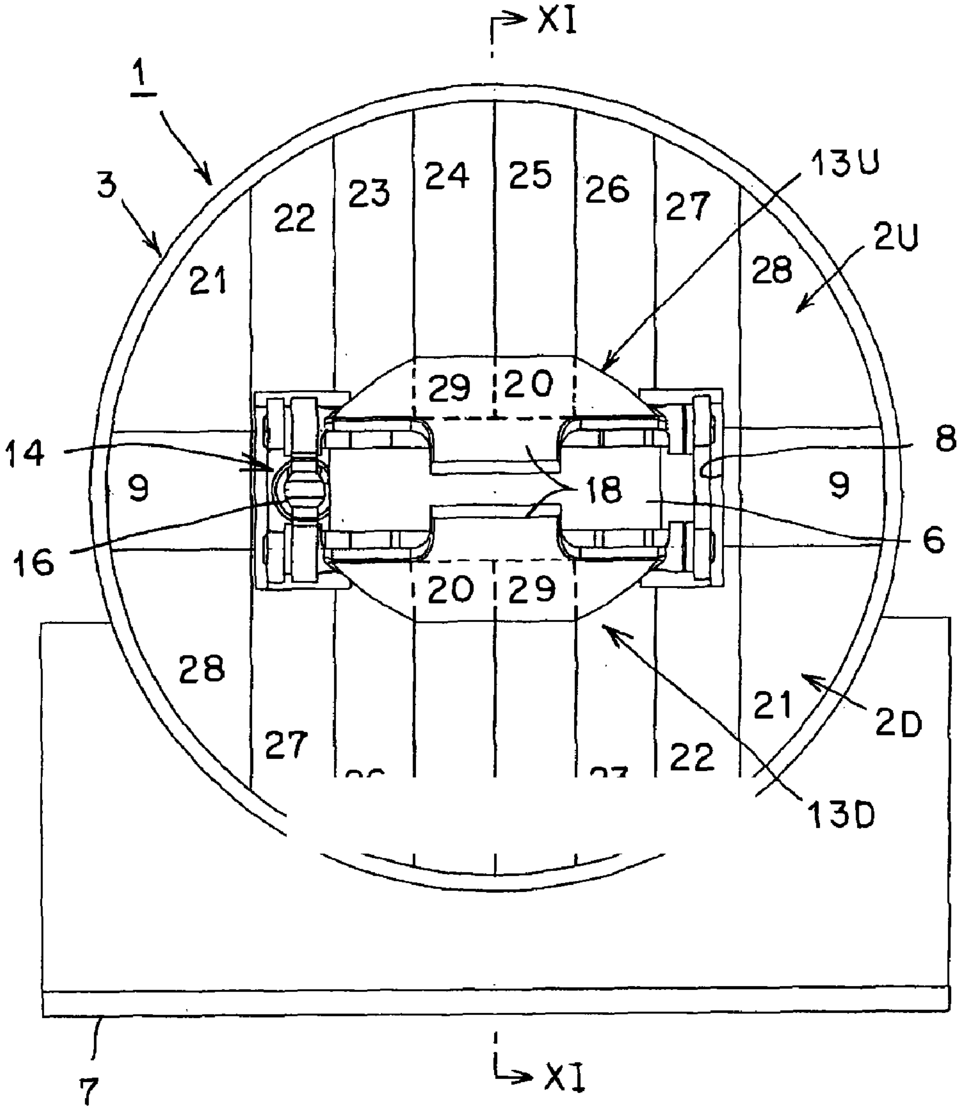
FIG. 9 is a front view showing the essential parts when the upside movable reflector and the downside movable reflector are positioned in the first location, similarly.
Figure 10:
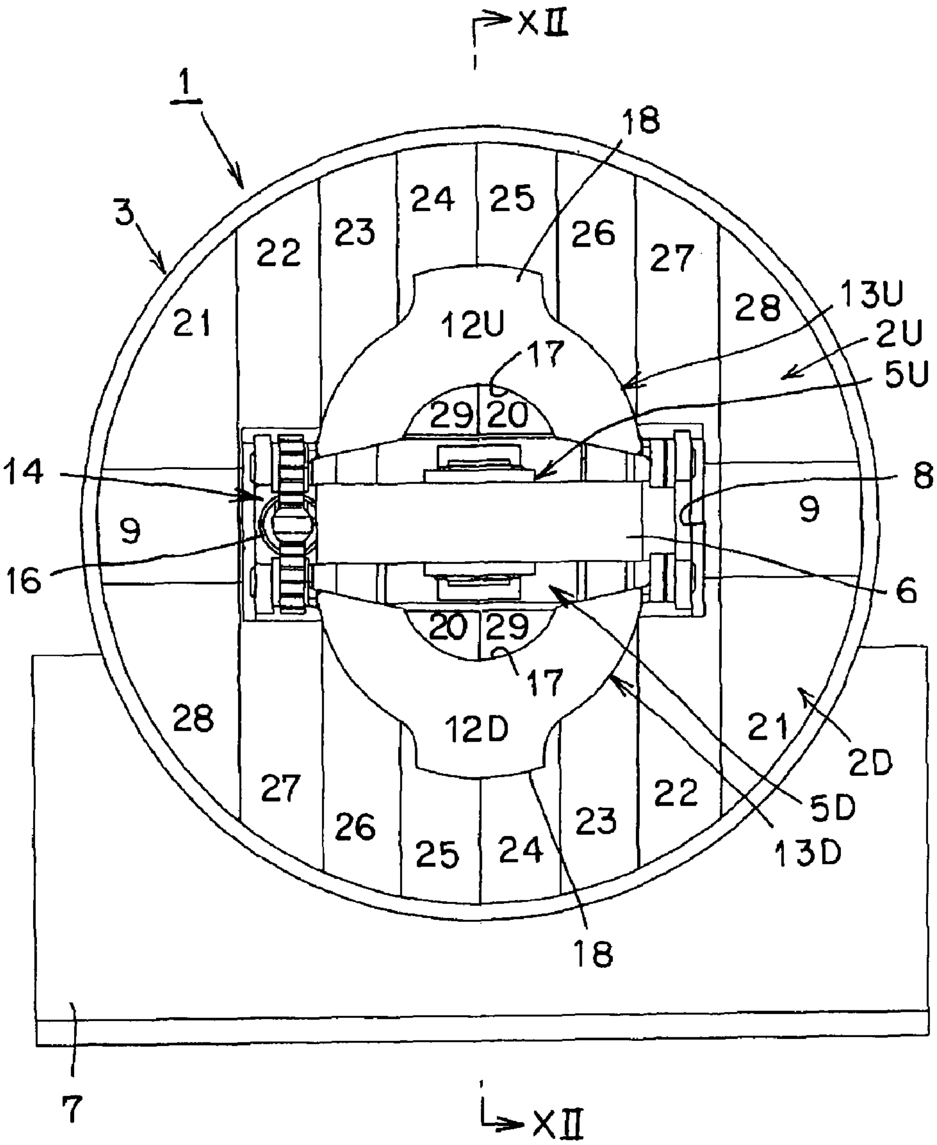
FIG. 10 is a front view showing the essential parts when the upside movable reflector and the downside movable reflector are positioned in the second location, similarly.

A part of the light, i.e., light L1 radiated onto the first reflecting surface for high beam (the first segment 21 and the eight segment 28) of the fixed reflector 3, as shown in FIG. 6 are shaded by means of the upside and downside movable reflectors 13U and 13D. In addition, a part of the light, i.e., reflection light L2 which has been reflected on the second reflecting surface for high beam (the ninth segment 29 and the tenth segment 20) of the fixed reflector 3, as shown in FIG. 6, are shaded by means of the upside and downside movable reflectors 13U and 13D. Further, light L3 that remains, as shown in FIG. 11, is reflected on the reflecting surfaces for low beams (the second segment 22, the third segment 23, the fourth segment 24, the fifth segment 25, the sixth segment 26, the seventh segment 27) of the upside and downside reflecting surfaces 2U and 2D, of the fixed reflector 3. The reflected light L3 is illuminated toward a forward direction of a vehicle, as a light distribution pattern LP for low beam, shown in FIG. 26. Direct light (not shown) from the light emitting chip 4 of the upside and downside semiconductor-type light sources 5U and 5D are shaded by means of the upside and downside movable reflectors 13U and 13D, in particular, a visor portion 18. In FIG. 11, the optical paths in a downward reflecting surface 2D of the fixed reflector 3 and a downward reflecting surface 12D of a downside movable reflector 13D are not shown.

In other words, the light reflected from the first reflecting surface made of the four segment 24 of the reflecting surfaces 2U, 2D is light-distributed and controlled in the range Z4 in the light distribution pattern LP for low beam, so that: the light reflected from the first reflecting surface made of the fourth segment 24 of the reflecting surfaces 2U, 2D do not run out of the oblique cutoff line CL1 and the horizontal cutoff line CL2; and a part of the reflection images I1, I2 of the light emitting chip 4 comes into substantial contact with the oblique cutoff line CL1 and the horizontal cutoff line CL2.

In addition, the light reflected from the second reflecting surface made of the fifth segment 25 of the reflecting surfaces 2U, 2D is light-distributed and controlled in the range Z5 containing the range Z4 in the light distribution pattern LP for low beam, so that: the reflection images I1, I3 of the light emitting chip 4 does not run out of the oblique cutoff line CL1 and the horizontal cutoff line CL2; and a part of the reflection images I1, I3 of the light emitting chip 4 comes into contact with the oblique cutoff line CL1 and the horizontal cutoff line CL2 or so that: the density of the group of the reflection images I1, I3 of the light emitting chip 4 becomes lower than that of the group of the reflection images I1, I2 of the light emitting chip 4 according to the first reflecting surface made of the forth segment 24; and the group of the reflection images I1, I3 of the light emitting chip 4 contains that of the reflection images I1, I2 of the light emitting chip 4 according to the first reflecting surface made of the fourth segment 24.

Further, the light reflected from the third reflecting surface made of the second segment 22, the third segment 23, the sixth segment 26, the seventh segment 27 of the reflecting surfaces 2U, 2D is light-distributed and controlled in the range Z6 containing the ranges Z4, Z5 in the light distribution pattern LP for low beam, so that: the reflection images I4, I5 of the light emitting chip 4 are substantially included in the light distribution pattern LP for low beam; the density of the group of the reflection images I4, I5 of the light emitting chip 4 becomes lower than that of the group of the reflecting surfaces I1, I2 of the light emitting chip 4 according to the first reflecting surface made of the fourth segment 24 and that of the group of the reflecting surfaces I1, I3 of the light emitting chip 4 according to the second reflecting surface made of the fifth segment 25; and the group of the reflecting surfaces I4, I5 of the light emitting chip 4 contains that of the reflecting surfaces I1, I2 of the light emitting chip 4 according to the first reflecting surface made of the fourth segment 24 and the group of the reflecting surfaces I1, I3 of the light emitting chip 4 according to the second reflecting surface made of the fifth segment 25.

In such a manner as described above, a light distribution pattern LP for low beam, shown in FIG. 26, is illuminated toward a forward direction of a vehicle.

Next, the upside and downside movable reflectors 13U and 13D are positioned in the second location (the location in the state shown in FIGS. 3, 5, 8, 10, 12, 14). In other words, power is distributed to the motor 15 of the drive unit 14, thereby driving the motor 15. A pinion 40 then rotates via a drive shaft 44 of the motor 15 and a rotary shaft 43 of the pinion 40. At this time, with the rotation of the rotary shaft 43 of the pinion 40, the spring 19 is pulled and wound around the rotary shaft 43, and a spring force increases. Due to the rotation of the pinion 40, a rack 41 moves in the direction indicated by the arrow H in FIGS. 3 and 5 in synchronism with rotation of the pinion 40 via the first rack portion 47. Due to the movement of the rack 41, an upside spur gear 42U rotates in the counterclockwise direction indicated by the arrow C in FIG. 3 in synchronism with the movement of the rack 41 and a downside spur gear 42D rotates in the clockwise direction indicated by the arrow D in FIG. 3 in synchronism with movement of the rack 41. Concurrently, the upside and downside movable reflectors 13U and 13D, move in synchronism with each other in the reverse directions. In this way, rotation of the motor 15 is decelerated in accordance with a rate between the number of teeth of the pinion 40 and the numbers of teeth of the upside and downside spur gears 42U and 42D, and the decelerated rotation is transmitted to the upside and downside movable reflectors 13U and 13D.

As shown in FIG. 5, after the stopper portion 51 of the stopper mechanism 50 has abutted against the second abutment portion 43, the upside and downside movable reflectors 13U and 13D are repositioned from the first location to the second location. When the upside and downside movable reflectors 13U and 13D are positioned in the second location, power is distributed to the motor 15. At this time, the light emitting chip 4 of the upside and downside semiconductor-type light sources 5U and 5D is illuminated to emit light. The light is then radiated from the light emitting chip 4 of the upside and downside semiconductor-type light sources 5U and 5D.

A part of the light, namely a part of the light radiated onto the reflecting surface for low beam (the second segment 22, the third segment 23, the fourth segment 24, the fifth segment 25, the sixth segment 26, the seventh segment 27) of the upside and downside reflecting surfaces 2U and 2D of the fixed reflector 3, is reflected on the third reflecting surface for high beam (reflecting surfaces 12U, 12D) of the movable reflectors 13U, 13D, as shown in FIG. 12, and the reflected light L4 is illuminated toward the forward direction of the vehicle, as the third light distribution pattern HP3 for high beam, shown in FIG. 27. In addition, the light radiated onto the reflecting surface for low beam (the second segment 22, the third segment 23, the fourth segment 24, the fifth segment 25, the sixth segment 26, the seventh segment 27) of the upside and downside reflecting surfaces 2U and 2D of the movable reflector 3, the remaining light which has not entered the third reflecting surface for high beam (reflecting surfaces 12U, 12D) of the movable reflectors 13U, 13D is reflected on the reflecting surfaces for low beam (the second segment 22, the third segment 23, the fourth segment 24, the fifth segment 25, the sixth segment 26, the seventh segment 27) of the fixed reflector 3, as shown in FIG. 12. The reflected light L3 is illuminated to the forward direction of the vehicle, as the light distribution pattern LP1 for dimming low beam, shown in FIG. 27. Further, when the upside and downside movable reflectors 13U and 13D are positioned in the first location, the light L1 radiated onto the first reflecting surface for high beam (the first segment 21 and the eighth segment 28) of the fixed reflector 3, shaded by means of the upside and downside movable reflectors 13U and 13D is reflected on the first reflecting surface for high beam (the first segment 21 and the eighth segment 28) of the fixed reflector 3, as shown in FIG. 12, and the reflected light L5 is illuminated to the forward direction of the vehicle, as the first light distribution pattern HP1 for high barn, shown in FIG. 27. Furthermore, when the upside and downside movable reflectors 13U and 13D are positioned in the first location, the light L2 reflected from the second reflecting surface for high beam (the ninth segment 29 and the tenth segment 20) of the fixed reflector 3, shaded by means of the upside and downside movable reflectors 13U and 13D, is illuminated to the forward direction of the vehicle, as the second light distribution pattern HP2 for high beam, shown in FIG. 27, via through holes 17 of the upside and downside movable reflectors 13U and 13D positioned in the second location. In FIG. 12, the optical paths in the downside reflecting surface 2D of the fixed reflector 3 and the downside reflecting surface 12D of the downside movable reflector 13D are not shown.

In such a manner as described above, the light distribution patterns HP1, HP2, HP3, LP1, shown in FIG. 27, are illuminated toward the forward direction of the vehicle.

Next, in a case where the upside and downside movable reflectors 13U and 13D, positioned in the second location, are changed over to the first location, power distribution to the motor 15 is shut off. The rotary shaft 43 of the pinion 40 then rotates due to the spring force of the spring 19. The pinion 40 rotates together with the rotation of the rotary shaft 43. Due to the rotation of the pinion 40, a rack 41 moves in the direction indicated by the arrow G in FIGS. 2 and 4 in synchronism with the rotation of the pinion 40, via the first rack portion 47. Due to the movement of the rack 41, the upside spur gear 42U rotates in the clockwise direction indicated by the arrow A in FIG. 2 in synchronism with the movement of the rack 41 and the downside spur gear 42D rotates in the counterclockwise direction indicated by the arrow B in FIG. 2 in synchronism with the movement of the rack 41 via the second rack portion 48. Concurrently, the upside and downside movable reflectors 13U and 13D rotate in synchronism with each other in the reverse directions. As shown in FIG. 4, after the stopper portion 51 of the stopper mechanism 50 has abutted against the first abutment portion 42, the upside and downside movable reflectors 13U and 13D are repositioned from the second position to the first position.

Afterwards, a fail-safe function works when the upside and downside movable reflectors 13U and 13D are positioned in the second location or when the upside and downside movable reflectors 13U and 13D rotate from the first location to the second location, if power feeding to the motor 15 is cut off. In other word, if power feeding to the motor 15 is cut off, power distribution to the motor 15 is shut off, and therefore, as described previously, the rotary shaft 43 of the pinion 40 rotates due to the spring force of the spring 19. The pinion 40 rotates together with the rotation of the rotary shaft 43. Due to the rotation of the pinion 40, the rack 41 moves in the direction indicated by the arrow G in FIGS. 2 and 4 in synchronism with the rotation of the pinion 40 via the first rack portion 47. Due to the movement of the rack 41, the upside spur gear 42U rotates in the clockwise direction indicated by the arrow A in FIG. 2 in synchronism with the movement of the rack 41 via the second rack portion 48 and the downside spur gear 42D rotates in the counterclockwise direction indicated by the arrow B in FIG. 2 in synchronism with the movement of the rack 41. Concurrently, the upside and downside movable reflectors 13U and 13D rotate in synchronism with each other in the reverse directions, respectively. As shown in FIG. 4, after the stopper portion 51 of the stopper mechanism 50 has abutted against the first abutment portion 42, the upside and downside movable reflectors 13U and 13D are repositioned from the second location to the first location. As a result, the light distribution patterns HP1, HP2, HP3, LP1 for high beams, shown in FIG. 27, or alternatively, the light distribution patterns whose states are changed over to the light distribution patterns HP1, HP2, HP3, LP1 for high beams, shown in FIG. 27, are changed over to the light distribution pattern LP for low beam, shown in FIG. 26. The fail-safe function thereby works.

The vehicle headlamp 1 in the embodiment is made of constituent elements and functions as described above, and hereinafter, advantageous effect(s) of these constituent elements will be described.

The vehicle headlamp 1 in the embodiment allows vibration at the time of vehicle cruising to act on the upside and downside reflectors 13U and 13D and acceleration in a given direction, for example, acceleration in the downward direction indicated by the arrow drawn by the thick solid line or acceleration in the upward direction indicated by the arrow drawn by the dotted line, in FIGS. 2 and 3, to occur at the upside and downside reflectors 13U and 13D. The rotational moment indicated by the arrow drawn by the thick solid line or the rotational moment indicated by the arrow drawn by the dotted line, in FIGS. 2 and 3, then work on the upside and downside reflectors 13U and 13D. The upside spur gear 42U of the upside reflector 13U and the downside spur gear 42D of the downside reflector 13D allows the forces in the reverse directions, namely the force in the direction indicated by the arrow drawn by the thick solid line and the force in the direction indicated by the arrow drawn by the dotted line, in FIGS. 2 and 3, to mutually act on the second rack portion 48 of the rack 41. As a result, the forces acting on the rack 41 in the reverse directions are mutually canceled out, and the upside and downside reflectors 13U and 13D are kept in a static state. Therefore, the vehicle headlamp 1 in the embodiment improves vibration proof and durability of the upside and downside reflectors 13U and 13D.

In addition, the vehicle headlamp 1 in the embodiment allows the mass of the upside movable reflector 13U to be equal to or substantially equal to that of the downside movable reflector 13D; and a distance RU from a gravity MU to a rotational center X of the upside movable reflector 13U to be equal to or substantially equal to a distance RD from a gravity MD to a rotational center X of the downside movable reflector 13D, so that the forces acting in the reverse directions, respectively, in a drive force transmission mechanism 16 become equal to or substantially equal to each other, and can be substantially completely canceled out each other. In this manner, the vehicle in the embodiment further improves vibration proof and durability of the upside and downside reflectors 13U and 13D.

Further, the vehicle headlamp 1 in the embodiment allows the upside and downside reflectors 13U and 13D to be returned to the first location due to action of a spring 19 for restoration, if driving of the drive unit 14, namely power feeding to the motor 15 is shut off, when the upside and downside reflectors 13U and 13D are positioned in the second location or is rotating from the first location to the second location. Thus, the vehicle headlamp 1 in the embodiment has a fail-safe function. In other words, the vehicle headlamp 1 in the embodiment allows the light distribution pattern LP for low beam, shown in FIG. 26, to be obtained when the upside and downside reflectors 13U and 13D are positioned in the first location, or alternatively, allows the light distribution patterns HP1, HP2, HP3, LP1 for high beams, shown in FIG. 27, to be obtained when the upside and downside reflectors 13U and 13D are positioned in the second location, so that the light distribution patterns HP1, HP2, HP3, LP1 for high beams, shown in FIG. 27, is obtained, thus enabling the light distribution pattern HP1, HP2, HP3, LP1 for high beams, shown in FIG. 27, to be changed over to the light distribution pattern LP for low beam, shown in FIG. 26.

Moreover, the vehicle headlamp 1 in the embodiment allows the spring 19 for restoration to be provided at the side of the drive force transmission mechanism 16 held at a lateral (right side) site relative to the upside and downside reflectors 13U and 13D and the upside and downside semiconductor-type light sources 5U and 5D and to be provided between the holder 6 and the drive unit 14, thus precluding the spring force of the spring 19 for restoration from directly acting on the upside and downside reflectors 13U and 13D. Therefore, since the vehicle headlamp 1 in the embodiment precludes an eccentric force of the spring force of the spring 19 for restoration from being applied to the upside and downside reflectors 13U and 13D, a distortion such as a torsion hardly occurs to the upside and downside reflectors 13U and 13D, and as a result, a light distribution change hardly occurs, so that light distribution can be controlled with high precision accordingly.

In addition, the vehicle headlamp 1 in the embodiment allows the spring 19 for restoration to be provided between: a coupling portion between the drive shaft 44 of the motor 15 of the drive unit 14 and the rotary shaft 43 of the pinion 40 of the drive force transmission mechanism 16; and the holder 6, so that the spring force (restoration torque) of the spring 19 for restoration can be directly imparted to the coupling portion between the drive shaft 44 of the motor 15 of the drive unit 14 and the rotary shaft 43 of the pinion 40 of the drive force transmission mechanism 16. In this manner, the vehicle headlamp 1 in the embodiment allows the upside and downside reflectors 13U and 13D to be automatically restored to the first location via the drive force transmission mechanism 16 with a small spring force (restoration torque) of the spring 19 for restoration, thus enabling downsizing and weight reduction of the spring 19 for restoration.

Further, the vehicle headlamp 1 in the embodiment allows the spring 19 for restoration to be provided between the holder 6 and the drive unit 14, so that the spring 19 for restoration can be disposed at a site spaced from a rotation holding site of the upside and downside reflectors 13U and 13D. In this manner, the vehicle head lamp 1 in the embodiment enables downsizing of a structure of the rotation holding site of the upside and downside reflectors 13U and 13D, so that the appearance of the headlamp can be improved accordingly.

Furthermore, the vehicle headlamp 1 in the embodiment allows the motor 15 of the drive unit 14 to be directly fixed and held on the heat sink member 7 via the holder 6, so that a heat generated while the motor 15 is driven can be radiated (dissipated) from the heat sink member 7 to the outside. In this manner, the vehicle headlamp 1 in the embodiment improves thermal resistance and durability of a drive source of a drive unit.

Still furthermore, the vehicle headlamp 1 in the embodiment allows either one of the upside and downside reflectors 13U and 13D to be dummy, thereby eliminating a need to provide the upside reflecting surface 12U or downside reflecting surface 12D at the other one of the upside and downside reflectors 13U and 13D. Therefore, the vehicle headlamp 1 in the embodiment simplifies a light distribution design or light distribution control of a reflecting surface of a movable reflector.

Yet furthermore, the vehicle headlamp 1 in the embodiment allows the rotational center X of the upside and downside movable reflectors 13U and 13D to be positioned at or near the center O1 of the light emitting chip 4, thus simplifying a light distribution design or light distribution control of the upside and downside reflecting surfaces 12U and 12D when the upside and downside movable reflectors 13U and 13D are positioned in the second location.

The foregoing embodiment described a light distribution pattern LP for low beam. However, in the present invention, there may be a light distribution pattern other than the light distribution pattern LP for low beam, for example, a light distribution pattern having an oblique cutoff line on a vehicle cruising lane side and a horizontal cutoff line on an opposite lane side with an elbow point serving as a boundary, such as a light distribution pattern for expressway or a light distribution pattern for fog lamp, for example.

In addition, the foregoing embodiment described the vehicle headlamp 1 for left-side cruising lane. However, the present invention is applicable to a vehicle headlamp for right-side cruising lane as well.

Further, the foregoing embodiment described the vehicle headlamp 1 in which the upside unit made of: the upside reflecting surfaces 2U, 12U and the upside semiconductor-type light source 5U; and the downside unit made of the downside reflecting surfaces 2D, 12D and the downside semiconductor-type light source 5D, are disposed in point-symmetrical state. However, in the present invention, there may be a vehicle headlamp comprised of only the upside unit made of the reflecting surfaces 2U, 12U and the upside semiconductor-type light source 5U or the downside unit made of the downside reflecting surfaces 2D, 12D and the downside semiconductor-type light source 5D. In this case, if either one of the upside and downside reflectors 13U and 13D is dummy, vibration proof of movable reflectors are improved as described previously.

What is claimed is:

1. A vehicle headlamp, comprising:

(i) a holder;

(ii) a first movable reflector and a second movable reflector, a respective one of which is rotatably held on the holder;

(iii) a light source which is fixed and held on the holder; and (iv) a drive unit for changing over a light distribution pattern while rotating the first movable reflector and the second movable reflector between a first location and a second location, respectively, in synchronism with each other, wherein:

the drive unit includes:

a drive source which is held on the holder; and a drive force transmission mechanism which is held on a lateral site relative to the first movable reflector, the second movable reflector, and the light source, of the holder, and is provided between the drive source and a respective one of the first movable reflector and the second movable reflector, for transmitting a drive force generated in the drive source to the first movable reflector and the second movable reflector, respectively, to rotate the first movable reflector and the second movable reflector, respectively, in reverse directions, wherein the drive source and the drive force transmission mechanism is a single drive source and a single drive force transmission mechanism configured to provide drive force to both the first movable reflector and second movable reflector.

2. The vehicle headlamp according to claim 1, wherein:

a mass of the first movable reflector is equal to or substantially equal to a mass of the second movable reflector; and a distance from a gravity to a rotational center of the first movable reflector is equal to or substantially equal to a distance from a gravity to a rotational center of the second movable reflector.

3. The vehicle headlamp according to claim 1, wherein:

between: a coupling portion between the drive source of the drive unit and the drive force transmission mechanism; and the holder, a restoration spring is provided for restoring the first movable reflector and the second movable reflector to the first location in a case where driving of the drive unit is stopped when the first movable reflector and the second movable reflector are positioned in the second location or is rotating from the first location to the second location.

4. The vehicle headlamp according to claim 1, wherein:

the drive source of the drive unit is directly fixed and held on a heat sink member via the holder.

5. The vehicle headlamp according to claim 1, wherein:

either one of the first movable reflector and the second movable reflector is dummy.

6. A vehicle headlamp, comprising:

(i) a semiconductor-type light source for illuminating light;

(ii) a first reflector made of a parabola-based curved face, including a plurality of reflecting surfaces for reflecting light radiated from the semiconductor-type light source as reflection light and illuminating the reflected light toward a forward direction of a vehicle;

(iii) a second reflector which is movable between a first location and a second location, for shading the light reflected by means of the reflecting surfaces of the first reflector and changing over a light distribution pattern in accordance with the shaded reflecting surface;

(iv) a drive unit which is driven in accordance with a power distribution state of a drive source, wherein:

the drive unit is driven in accordance to the power distribution state of the drive source to thereby move the second reflector between the first location and the second location, and a restoration spring for holding a restoration force to the first location, as the second reflector moves from the first location to the second location, and moving the second reflector from the second location to the first location by utilizing the restoration force.

7. The vehicle headlamp according to claim 6, wherein:

the second reflector has a rotary shaft, and is adapted to be rotatable between the first location and the second location via the rotary shaft; and the drive unit includes a drive force transmission mechanism which moves in a forward/backward direction of the vehicle in accordance with a power distribution state of the drive source, for transmitting a drive force to the rotary shaft of the second reflector due to the movement.

8. The vehicle headlamp according to claim 6, wherein:

the drive unit drives the second reflector to move from the first location to the second location in a state in which power is distributed to the drive source; and drives the second reflector to move from the second location to the first location in a state in which power is not distributed to the drive source.

9. The vehicle headlamp according to claim 6, wherein:

the drive unit drives the second reflector to move from the first location to the second location in a state in which power is distributed to the drive source; and drives the second reflector to move from the second location to the first location by utilizing the restoration force of the restoration spring in a state in which power is not distributed to the drive source.

10. The vehicle headlamp according to claim 6, further including a stopper mechanism for braking the second reflector to the first location or the second location.

11. The vehicle headlamp according to claim 6, wherein:

the plurality of reflecting surfaces of the first reflector include a reflecting surface for a light distribution pattern for low beam and a reflecting surface for a light distribution pattern for high beam;

the second reflector includes the reflecting surface for the light distribution pattern for high beam;

when the second reflector is in the first location, reflection light reflected on the reflecting surface for the light distribution pattern for high beam, of the first reflector, is shaded by means of the reflecting surface for the light distribution pattern for high beam, of the second reflector;

the reflection light reflected on the reflecting surface for the light distribution pattern for low beam, of the first reflector, is illuminated to the forward direction of the vehicle, as a light distribution pattern for low beam;

when the second reflector is in the second location, reflection light reflected on the reflecting surface for the light distribution pattern for low beam, of the first reflector, is shaded by means of the reflecting surface for the light distribution pattern for high beam, of the second reflector; and a respective one of beams of the reflection light reflected on the reflecting surface for the light distribution pattern for low beam, of the first reflector, and the reflecting surface for the light distribution pattern for high beam, of the second reflector, is illuminated to the forward direction of the vehicle, as a light distribution pattern for high beam.

12. A vehicle headlamp, comprising:

(i) a semiconductor-type light source for illuminating light;

(ii) a first reflector made of a parabola-based free curved face, including a plurality of reflecting surfaces for reflecting light radiated from the semiconductor-type light source as reflection light and illuminating the reflected light toward a forward direction of a vehicle;

(iii) a second reflector which is movable between a first location and a second location, for shading the light reflected by means of the reflecting surfaces of the first reflector and changing over a light distribution pattern in accordance with the shaded reflecting surface; and (iv) a drive unit which is driven in accordance with a power distribution state of a drive source to thereby move the second reflector between the first location and the second location, the second reflector having a rotary shaft, and being adapted to be rotatable between the first location and the second location via the rotary shaft, wherein:

the drive unit includes a drive force transmission mechanism which moves in a forward/backward direction of the vehicle in accordance with a power distribution state of the drive source, for transmitting a drive force to the rotary shaft of the second reflector due to the movement.

13. The vehicle headlamp according to claim 12, wherein:

the drive unit drives the second reflector to move from the first location to the second location in a state in which power is distributed to the drive source; and drives the second reflector to move from the second location to the first location in a state in which power is not distributed to the drive source.

14. The vehicle headlamp according to claim 12, further including a restoration spring for holding a restoration force to the first location, as the second reflector moves from the first location to the second location, and moving the second reflector from the second location to the first location by utilizing the restoration force.

15. The vehicle headlamp according to claim 12, further including a restoration spring for holding a restoration force to the first location, as the second reflector moves from the first location to the second location, and moving the second reflector from the second location to the first location by utilizing the restoration force, wherein:

the drive unit drives the second reflector to move from the first location to the second location in a state in which power is distributed to the drive source; and drives the second reflector to move from the second location to the first location by utilizing the restoration force of the restoration spring in a state in which power is not distributed to the drive source.

16. The vehicle headlamp according to claim 12, further including a stopper mechanism for braking the second reflector to the first location or the second location.

17. The vehicle headlamp according to claim 12, wherein:

the plurality of reflecting surfaces of the first reflector includes a reflecting surface for a light distribution pattern for low beam and a reflecting surface for a light distribution pattern for high beam;

the second reflector includes the reflecting surface for the light distribution pattern for high beam;

when the second reflector is in the first location, reflection light reflected on the reflecting surface for the light distribution pattern for high beam, of the first reflector, is shaded by means of the reflecting surface for the light distribution pattern for high beam, of the second reflector;

the reflection light reflected on the reflecting surface for the light distribution pattern for low beam, of the first reflector, is illuminated to the forward direction of the vehicle, as a light distribution pattern for low beam;

when the second reflector is in the second location, reflection light reflected on the reflecting surface for the light distribution pattern for low beam, of the first reflector, is shaded by means of the reflecting surface for the light distribution pattern for high beam, of the second reflector; and a respective one of beams of the reflection light reflected on the reflecting surface for the light distribution pattern for low beam, of the first reflector, and the reflecting surface for the light distribution pattern for high beam, of the second reflector, is illuminated to the forward direction of the vehicle, as a light distribution pattern for high beam.

* * * * *